US007619539B2

(12) United States Patent
Veskovic et al.

(10) Patent No.: US 7,619,539 B2
(45) Date of Patent: Nov. 17, 2009

(54) MULTIPLE-INPUT ELECTRONIC BALLAST WITH PROCESSOR

(75) Inventors: Dragan Veskovic, Allentown, PA (US); Robert A. Anselmo, Allentown, PA (US); Mark Taipale, Harleysville, PA (US); Matthew Skvoretz, Emmaus, PA (US); Joel S. Spira, Coopersburg, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 424 days.

(21) Appl. No.: 10/824,248

(22) Filed: Apr. 14, 2004

(65) Prior Publication Data

US 2005/0179404 A1 Aug. 18, 2005

Related U.S. Application Data

(60) Provisional application No. 60/544,479, filed on Feb. 13, 2004.

(51) Int. Cl.
*G05B 19/02* (2006.01)

(52) U.S. Cl. ............................ 340/825.22; 340/825.52; 340/310.16; 340/310.1; 340/825

(58) Field of Classification Search ............ 340/825.22, 340/825.52, 310.16, 310.1, 815.6, 538.15, 340/825; 315/292, 291, 316, 314
See application file for complete search history.

(56) References Cited

U.S. PATENT DOCUMENTS

| | | | | |
|---|---|---|---|---|
| 4,158,132 | A * | 6/1979 | O'Dell | 250/205 |
| 4,467,314 | A | 8/1984 | Weikel et al. | 340/310 |
| 4,874,989 | A | 10/1989 | Nilssen | 315/151 |
| 5,154,504 | A * | 10/1992 | Helal et al. | 362/20 |
| 5,216,333 | A | 6/1993 | Nuckolls et al. | 315/291 |
| 5,252,894 | A | 10/1993 | Bank et al. | 315/307 |
| 5,352,957 | A | 10/1994 | Werner | 315/291 |
| 5,453,738 | A | 9/1995 | Zirkl et al. | 340/825.52 |
| 5,455,487 | A | 10/1995 | Mix et al. | 315/150 |
| 5,471,119 | A | 11/1995 | Ranganath et al. | 315/307 |
| 5,519,289 | A | 5/1996 | Katyl et al. | 315/224 |
| 5,539,281 | A | 7/1996 | Shackle et al. | 315/224 |

(Continued)

FOREIGN PATENT DOCUMENTS

DE 4 243 957 A1 6/1994

(Continued)

OTHER PUBLICATIONS

Tridonic.Atco, "Electronic ballasts for dimming to 3%(10%) compact lamps," *Data Sheet,* Jun. 2002, 4 pages.

(Continued)

*Primary Examiner*—Tuyet Vo
(74) *Attorney, Agent, or Firm*—Woodcock Washburn LLP

(57) ABSTRACT

A ballast having a microprocessor embedded therein is controlled via four inputs. The ballast includes a high-voltage phase-controlled signal provided by a dimmer and an infrared (IR) receiver through which the ballast can receive data signals from an IR transmitter. The ballast can also receive commands from other ballasts or a master control on the serial digital communication link, such as a DALI protocol link. The fourth input is an analog signal, which is simply a DC signal that linearly ranges in value from a predetermined lower limit to a predetermined upper limit, corresponding to the 0% to 100% dimming range of the load. The output stage of the ballast includes one or more FETs, which are used to control the current flow to the lamp. Based on these inputs, the microprocessor makes a decision on the intensity levels of the load and directly drives the FETs in the output stage.

30 Claims, 12 Drawing Sheets

U.S. PATENT DOCUMENTS

| | | | | |
|---|---|---|---|---|
| 5,544,037 | A | 8/1996 | Luger | 364/146 |
| 5,554,979 | A | 9/1996 | Kohar et al. | 340/825.72 |
| 5,565,855 | A | 10/1996 | Knibble | 340/825.06 |
| 5,661,347 | A | 8/1997 | Luger et al. | 307/39 |
| 5,675,221 | A | 10/1997 | Yoo et al. | 315/291 |
| 5,838,116 | A * | 11/1998 | Katyl et al. | 315/307 |
| 5,866,992 | A | 2/1999 | Geiginger et al. | 35/294 |
| 5,925,990 | A | 7/1999 | Crouse et al. | 315/307 |
| 5,969,492 | A | 10/1999 | Motte et al. | 318/266 |
| 6,025,679 | A | 2/2000 | Harper et al. | 315/312 |
| 6,040,661 | A * | 3/2000 | Bogdan | 315/224 |
| 6,091,200 | A | 7/2000 | Lenz | 315/159 |
| 6,094,016 | A | 7/2000 | Luger et al. | 315/295 |
| 6,114,970 | A | 9/2000 | Kirson et al. | 340/825.52 |
| 6,118,231 | A | 9/2000 | Geiginger et al. | 315/312 |
| 6,119,076 | A | 9/2000 | Williams et al. | 702/188 |
| 6,181,086 | B1 | 1/2001 | Katyl et al. | 315/307 |
| 6,310,440 | B1 | 10/2001 | Lansing et al. | 315/149 |
| 6,388,396 | B1 | 5/2002 | Katyl et al. | 315/294 |
| 6,388,400 | B1 | 5/2002 | Noh | 315/318 |
| 6,388,404 | B1 | 5/2002 | Schnebly et al. | 318/16 |
| 6,498,440 | B2 * | 12/2002 | Stam et al. | 315/291 |
| 6,507,158 | B1 | 1/2003 | Wang | 315/294 |
| 6,522,086 | B2 * | 2/2003 | Gemunder et al. | 315/291 |
| 6,583,573 | B2 | 6/2003 | Bierman | 315/149 |
| 6,761,470 | B2 * | 7/2004 | Sid | 362/233 |
| 6,762,570 | B1 * | 7/2004 | Fosler | 315/312 |
| 6,771,029 | B2 * | 8/2004 | Ribarich et al. | 315/292 |
| 6,794,830 | B2 * | 9/2004 | Lansing et al. | 315/291 |
| 6,798,341 | B1 | 9/2004 | Eckel et al. | 340/521 |
| 7,030,578 | B2 | 4/2006 | Orsat | 318/16 |
| 7,102,339 | B1 * | 9/2006 | Ferguson | 323/284 |
| 7,109,668 | B2 * | 9/2006 | Pogodayev et al. | 315/307 |
| 2001/0040805 | A1 | 11/2001 | Lansing et al. | 362/276 |
| 2002/0065583 | A1 | 5/2002 | Okada et al. | 700/295 |
| 2002/0154025 | A1 | 10/2002 | Ling | 340/825.69 |
| 2002/0158591 | A1 | 10/2002 | Ribarich et al. | 315/291 |
| 2003/0001516 | A1 | 1/2003 | Newman, Jr. et al. | 315/224 |
| 2003/0001522 | A1 | 1/2003 | Newman, Jr. et al. | 315/291 |
| 2003/0020595 | A1 | 1/2003 | Wacyk | 340/3.5 |
| 2003/0036807 | A1 | 2/2003 | Fosler | 700/3 |
| 2003/0048626 | A1 | 3/2003 | Johler et al. | 362/20 |
| 2003/0107332 | A1 | 6/2003 | Newman, Jr. et al. | 315/307 |
| 2003/0222603 | A1 | 12/2003 | Mogilner et al. | 315/294 |
| 2004/0002792 | A1 | 1/2004 | Hoffknecht | 700/295 |
| 2005/0029967 | A1 * | 2/2005 | Chen et al. | 315/291 |

FOREIGN PATENT DOCUMENTS

| | | | |
|---|---|---|---|
| DE | 195 30 643 | A1 | 5/1996 |
| EP | 0 688 153 | A2 | 12/1995 |
| EP | 0 689 373 | A2 | 12/1995 |
| EP | 0 706 307 | A2 | 4/1996 |
| EP | 0 989 787 | A2 | 3/2000 |
| EP | 1 292 175 | A1 | 3/2003 |
| GB | 2 390 203 | | 12/2003 |
| WO | WO 99/23858 | | 5/1999 |
| WO | WO 02/082283 | A2 | 10/2002 |

OTHER PUBLICATIONS

Tröstl, A., "Let There Be Light!, A Self Configuring Dimming Interface for Fluorescent Lamp Ballasts", *IEEE Industry Applications Magazine,* Nov./Dec. 2004, 12-18.

* cited by examiner

MULTIPLE-INPUT ELECTRONIC BALLAST WITH PROCESSOR

CROSS REFERENCE TO RELATED APPLICATIONS

The present application claims priority to U.S. Provisional Application No. 60/544,479, filed Feb. 13, 2004, entitled "Multiple-Input Electronic Ballast With Processor" which is hereby incorporated by reference in its entirety.

FIELD OF THE INVENTION

The present invention generally relates to electronic ballasts, and more particularly to ballasts having processors therein for controlling a gas discharge lamp in response to a plurality of inputs.

BACKGROUND

A conventional ballast control system, such as a system conforming to the Digital Addressable Lighting Interface (DALI) standard as defined in the International Electrotechnical Commission Document, IEC 60929, includes a hardware controller for controlling the ballasts in the system. Typically, the controller is coupled to the ballasts in the system via a single digital serial interface, wherein data is transferred in accordance with DALI protocol. A disadvantage of this single interface is that the bandwidth of the interface limits the amount of message traffic that can reasonably flow between the controller and the ballasts. This can also create delays in response times to commands. Further, a typical DALI compatible ballast control system is limited to 64 ballasts on a communication link. This also creates a disadvantage in that additional controllers are required to accommodate systems having more than 64 ballasts. Yet another disadvantage of a ballast control system having a single controller is that the controller is a single point failure.

That is, if the controller fails, the entire system is down. This is especially burdensome in lighting systems installed at remote locations.

Typically, these systems are configured in a polled configuration requiring a ballast to first receive a transmission from the controller before the ballast can transmit. This can cause response time delays, especially in large systems. Also, these systems do not allow ballasts to be addressed by devices other than the DALI compatible interface, thus limiting the flexibility and size of the control system.

Further, many conventional ballast control systems, such as non-DALI systems, do not allow separate control of individual ballasts or groups of ballasts within the system. Systems that do provide this ability typically require separate control lines for each zone, a dedicated computer, and complicated software to carry out the initial set-up or future rezoning of the system.

Many conventional ballasts include significant analog circuitry to receive and interpret control inputs, to manage the operation of the power circuit and to detect and respond to fault conditions. This analog circuitry requires a large number of parts which increases cost and reduces reliability. In addition, the individual functions performed by this circuitry are often interdependent. This interdependence makes the circuits difficult to design, analyze, modify and test. This further increases the development cost for each ballast design.

These prior art systems lack a simple solution or device for controlling the ballasts and lamps. Thus, an electronic ballast circuit that contains fewer parts to reduce cost and increase reliability, provides flexibility and growth, and does not require a controller dedicated to controlling an entire system is desired.

SUMMARY OF THE INVENTION

A multiple-input ballast having a processor for controlling a gas discharge lamp in accordance with the present invention includes a processor, such as a microprocessor or digital signal processor (DSP), for receiving multiple inputs and controlling a discharge lamp in response to the inputs. The lamps include compact and conventional gas discharge lamps. The multiple processor input terminals are all active concurrently. The ballast processor uses these inputs, along with feedback signals indicating internal ballast conditions, to determine the desired intensity level of the lamp. Input signals provided to the processor include analog voltage level signals (such as the conventional 0-10 V analog signal for example), though it is understood that other voltage ranges or an electrical current signal could be used as well, digital communications signals including but not limited to those conforming to the Digital Addressable Lighting Interface (DALI) standard, phase control signals, infrared sensor signals, optical sensor signals, temperature sensor signals, sense signals derived from wired and/or wireless external devices, and sense signals providing information pertaining to electrical parameters such as current and voltage of the AC power supply (e.g., line) and the lamp. The ballast can also receive commands from other ballasts or a master control on a digital communication link, such as a DALI protocol link. This communication link is preferably bi-directional, allowing for the ballast to send commands, information regarding the ballast's settings, and diagnostic feedback to other devices on the communication link. The multiple-input ballast does not need an external, dedicated controller to control the lamp. A system of multiple-input ballasts can be configured as a distributed system, not needing a controller, and thus not creating a single point failure as in controller centric systems. However, a system of multiple-input ballasts can be configured to include a controller if desired. Each ballast processor contains memory. The processor memory is used, among other things, to store and retrieve set point algorithms, or procedures, for controlling the lamps in accordance with priorities and sequence of commands received via the ballast input signals. Also, a portion of the data stored in the processor memory can include information relating to the ballast's location and/or the ballast's duties in a system.

The multiple-input ballast comprises an inverter circuit that drives one or more output switches, such as field effect transistors (FETs), that control the amount of current delivered to the load (lamp). The ballast processor controls the intensity of the lighting load by directly controlling the switch(es) in the inverter circuit.

BRIEF DESCRIPTION OF THE DRAWINGS

The features and advantages of the present invention will be best understood when considering the following description in conjunction with the accompanying drawings, it being understood, however, that the invention is not limited to the specific methods and instrumentality disclosed. In the drawings.

DETAILED DESCRIPTION OF ILLUSTRATIVE EMBODIMENTS

Figure 1:
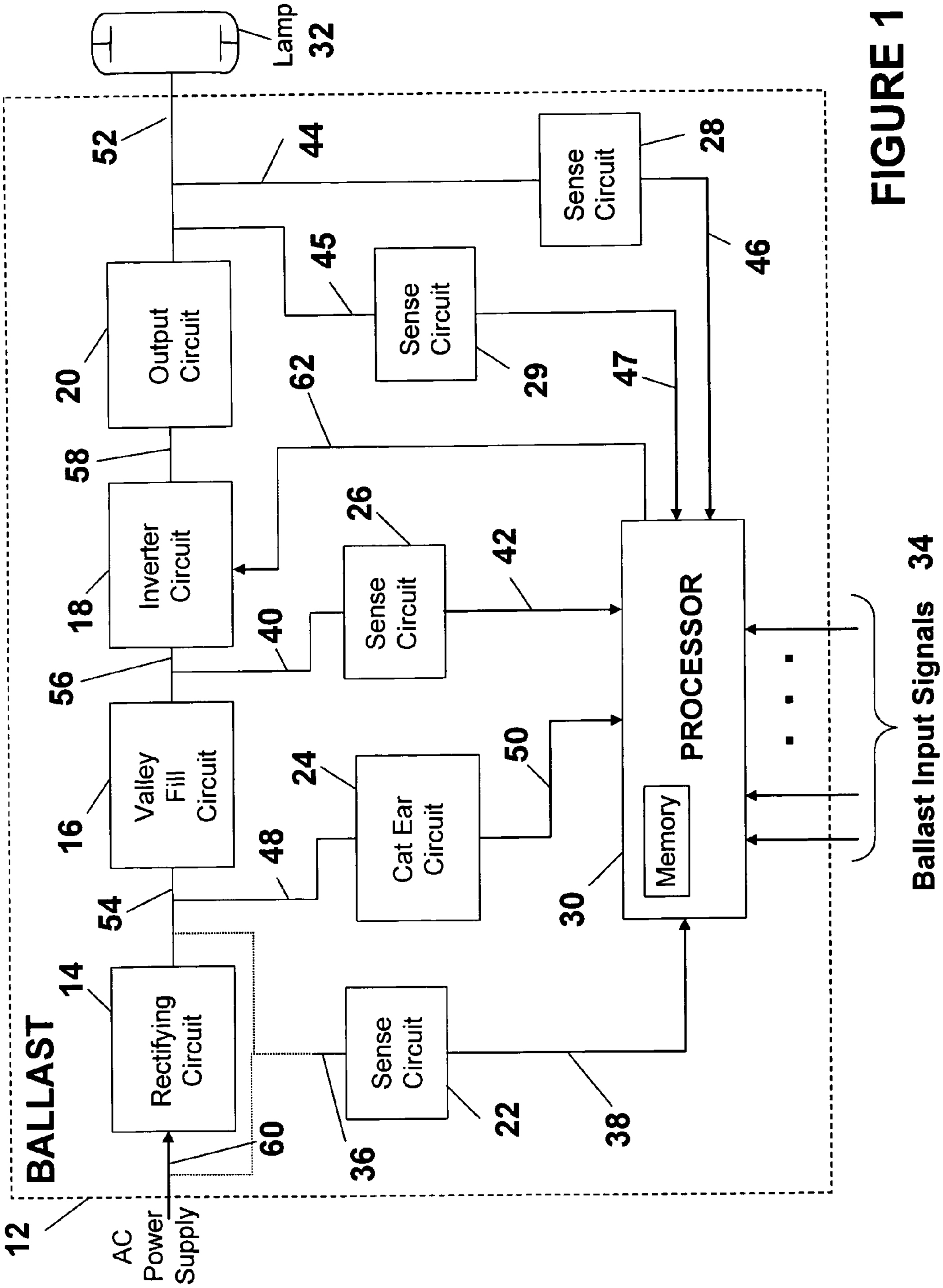
FIG. 1 is a block diagram of a multiple-input ballast having a processor in accordance with an exemplary embodiment of the present invention.

FIG. 1 is a block diagram of a multiple-input ballast 12 having a processor 30 in accordance with an exemplary embodiment of the present invention. As shown in FIG. 1, ballast 12 comprises rectifying circuit 14, valley fill circuit 16, inverter circuit 18, output circuit 20, cat ear circuit 24, optional sense circuits 22, 26, 28, 29, and processor 30. The ballast 12 controls the gas discharge lamp 32 via ballast output signal 52 in accordance with ballast input signals 34 and the various sense signals 38, 42, 46, 47. Although depicted as a single lamp 32 in FIG. 1, the ballast 12 is also capable of controlling a plurality of lamps. To better understand the ballast 12, an overview of the ballast 12 is provided below with reference to FIG. 1. A more detailed description of portions of the ballast is provided in published patent application, Pub. No. US 2003/0107332, patent application Ser. No. 10/006,036, filed Dec. 5, 2001, entitled "Single Switch Electronic Dimming Ballast", assigned to the assignee of the present application, and published patent application, Pub. No. US 2003/0001516, patent application Ser. No. 09/887,848, filed Jun. 22, 2001, entitled "Electronic Ballast", also assigned to the assignee of the present application, both applications hereby incorporated by reference in their entirety as if presented herein.

As shown in the exemplary embodiment depicted in FIG. 1, the rectifying circuit 14 of ballast 12 is capable of being coupled to an AC (alternating current) power supply. Typically the AC power supply provides an AC line voltage at a specific line frequency of 50 Hz or 60 Hz, although applications of the ballast 12 are not limited thereto. The rectifying circuit 14 converts the AC line voltage to a full wave rectified voltage signal 54. The full wave rectified voltage signal 54 is provided to the valley fill circuit 16. It is to be understood that whenever a signal is provided, connected, coupled, coupled in circuit relation, or connectable to another device, the signal may be indirectly coupled, e.g., via wireless means (such as via an IR or RF link), directly connected by a wire, or connected through a device such as, but not limited to, a resistor, diode, and/or a controllably conductive device, configured in series and/or parallel. It is also to be understood that a message (e.g., information embodied in a signal) can be in the form of a digital command, analog level, a pwm (pulse width modulated) waveform, or the like.

The valley fill circuit 16 selectively charges and discharges an energy storage device to create a valley filled voltage signal 56. The valley filled voltage signal 56 is provided to the inverter circuit 18. The inverter circuit 18 converts the valley filled voltage signal 56 to a high-frequency AC voltage signal 58. As described in more detail below, the inverter circuit 18 performs this conversion in accordance with information provided via processor output signal 62. The high-frequency AC voltage signal 58 is provided to the output circuit 20. The output circuit 20 filters the high-frequency AC voltage signal 58, provides voltage gain, and increases output impedance, resulting in ballast output signal 52. The ballast output signal 52 is capable of providing an electrical current (e.g., lamp current) to a load such as a gas discharge lamp 32. The cat ear circuit 24 is coupled to the full wave rectified voltage signal 54.

The cat ear circuit 24 provides auxiliary power to the processor 30 via cat ear signal 50 and facilitates shaping of the electrical current waveform drawn from the input power signal 60 provided to the valley fill circuit 16 to reduce ballast input current total harmonic distortion. Various sense circuits, 22, 26, 28, 29, sense electrical parameters via sense circuit input signals 36, 40, 44, 45, respectively, such as current and/or voltage, and provide signals indicative of the sensed parameters to the processor 30. Other sense circuits not shown in FIG. 1 are applicable, for example a temperature sense circuit for sensing the temperature of the ballast 12 and providing a temperature sense signal indicative of the ballast temperature to the processor 30. The application of specific sense circuits is optional. In one embodiment: (1) sense circuit 22 is a current sense circuit for sensing current values from either the input signal 60 or the full wave rectified voltage signal 54 and providing sense signal 38 indicative of the sensed current values to the processor 30; (2) sense circuit 26 is a voltage sense circuit for sensing voltage values of the valley filled voltage signal 56 and providing sense signal 42 indicative of the sensed voltage values to the processor 30; and (3) sense circuit 28 is a current sense circuit for sensing current values from the ballast output signal 52 and providing sense signal 46 indicative of the sensed current values to the processor 30; (4) sense circuit 29 is a voltage sense circuit for sensing voltage values from the ballast output signal 52 and providing sense signal 47 indicative of the sensed voltage values to the processor 30. It is to be understood that the specific configuration of sense circuits depicted in FIG. 1 and described above is exemplary, and ballast 12 is not limited thereto.

The processor 30 can comprise any appropriate processor such as a microprocessor, a microcontroller, a digital signal processor (DSP), a general purpose processor, an application specific integrated circuit (ASIC), a dedicated processor, specialized hardware, general software routines, specialized software, or a combination thereof. An exemplary embodiment of a microprocessor comprises an electronic circuit, such as a large scale, integrated semiconductor integrated circuit capable of executing computations and/or logical algorithms in accordance with binary instructions contained in a stored program that resides in either internal or external memory devices. The microprocessor can be in the form of a general purpose microprocessor, a microcontroller, a DSP (digital signal processor), a microprocessor or state machine that is embedded in an ASIC or field programmable device, or other form of fixed or configurable electronic logic and memory. Further, a program can be stored in memory residing within the microprocessor, in external memory coupled to the microprocessor, or a combination thereof The program can comprise a sequence of binary words or the like that are recognizable by the microprocessor as instructions to perform specific logical operations.

In one embodiment, the processor 30 performs functions in response to the status of the ballast 12. The status of the ballast 12 refers to the current condition of the ballast 12, including but not limited to, on/off condition, running hours, running hours since last lamp change, dim level, operating temperature, certain fault conditions including the time for which the fault condition has persisted, power level, and failure conditions. The processor 30 comprises memory, including non-volatile storage, for storage and access of data and software utilized to control the lamp 32 and facilitate operation of the ballast 12. The processor 30 receives ballast input signals 34 and various sense signals (e.g., sense signals 38, 42, 46, 47) via respective processor terminals on the processor 30 (terminals not shown in FIG. 1). The processor 30 processes the received signals, and provides processor output signal 62 to the inverter circuit 18 for controlling the gas discharge lamp 32. In one embodiment, the ballast input signals 34 and the sense signals are always active, thus allowing the ballast input signals 34 and the sense signals to be received by the processor 30 in real time. The processor 30 can use a combination of present and past values of sense signals and computational results to determine the present operating condition of the ballast. However, the processor 30 is configurable to allow only selected processor terminals to be active.

Figure 2:
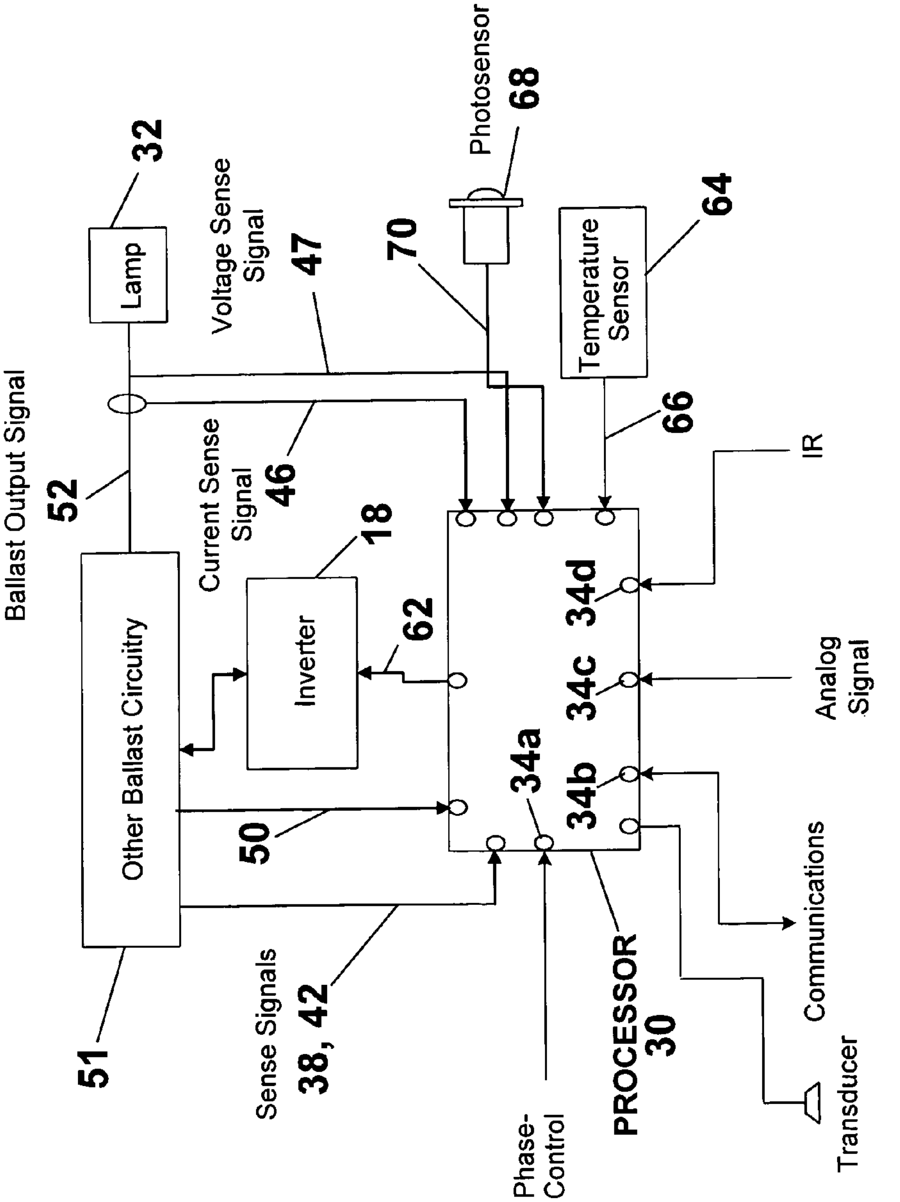
FIG. 2 is a block diagram showing various exemplary signals provided to the processor via processor terminals in accordance with an exemplary embodiment of the present invention.

FIG. 2 is a block diagram showing various exemplary signals provided to the processor 30 via processor terminals in accordance with an exemplary embodiment of the present invention. For the sake of clarity, some of the circuitry shown in FIG. 1 is represented collectively as other ballast circuitry 51 in FIG. 2. Further for the sake of clarity, only a subset of the processor terminals is labeled (34*a*, 34*b*, 34*c*, 34*d*) corresponding to the ballast input signals 34 shown in FIG. 1. The ballast input signals 34 can comprise any appropriate signals for controlling the lamp 32. As shown in FIG. 2, exemplary ballast input signals comprise a phase controlled input signal coupled to processor terminal 34*a*, a communications signal coupled to processor terminal 34*b*, an analog voltage signal coupled to processor terminal 34*c*, and an electrical signal from an infra-red (IR) receiver coupled to processor terminal 34*d*. It is emphasized that the ballast input signals shown in FIG. 2 are exemplary. Other types and number of ballast input signals are applicable, for example, the processor can be coupled to multiple IR signals, multiple analog voltage or current signals, power line carrier signals, and two-state signals including, but not limited to, a contact closure signal from an occupancy sensor. In an exemplary embodiment, a transducer is in electrical communication with the microprocessor for providing a signal perceptible to a person, such as an audible signal for example.

The phase control signal can be provided, for example, by a dimmer for dimming the output light level of the lamp 32. In an exemplary embodiment, the phase control signal interface comprises a 3-wire phase control interface. The communications signal can include, for example, a digital communications signal, an analog communications signal, a serial communications signal, a parallel communications signal, or a combination thereof. In an exemplary embodiment, the communications signal is provided by a bidirectional digital serial data interface. The bidirectional interface allows the processor 30 to send and receive messages, such as ballast control information, system control information, status requests, and status reports, for example. The analog signal processor terminal (e.g., 34*c*) is capable of receiving an analog signal. This analog signal can be derived from any of the sensors described above. Further, the analog terminal can be coupled to various sensors or multiple analog terminals may be coupled to combinations of sensors. For example, the analog terminal 34*c* can be coupled to the photosensor 68 for receiving the optical sense signal 70, and another analog terminal (not labeled in FIG. 2) can be coupled to the temperature sensor 64 for receiving the temperature sense signal 66, or combinations thereof. The IR terminal (e.g. 34*d*) can be coupled to an infrared detector for receiving serially encoded instructions from an IR hand-held remote transmitter. The ballast 12 may contain means for conducting the beam of infrared light transmitted by the hand-held remote transmitter to an infrared detector within the ballast, and the infrared detector is coupled to the IR terminal 34*d* of the processor 30. Alternatively, this means can be attached to the ballast, or incorporated into a separate module that is connected by wires to the ballast 12. The data pattern represented by the modulation of the IR beam is extracted by the infrared detector and provided thereby to the processor 30. The processor 30 decodes the pattern to extract the information encoded in the data stream, such as lamp light level commands, operating parameters, and address information, for example.

The processor 30 is capable of receiving sense signals. Sense signals may comprise any appropriate signal for controlling the lamp 32 and/or facilitating operation of the ballast 12. Examples of sense signals include sense signals indicative of electrical parameters of the ballast 12 (e.g., 38, 42, 46, 47), temperature sense signals, such as temperature sense signal 66 provided by temperature sensor 64, an optical sense signal 70 provided by photosensor 68, or a combination thereof. In an exemplary embodiment, interface circuitry (not shown in FIG. 2) is utilized to process signals provided to the processor 30. The interface circuitry may perform functions including voltage level shifting, attenuation, filtering, electrical isolation, signal conditioning, buffering, or a combination thereof.

Figure 3A:
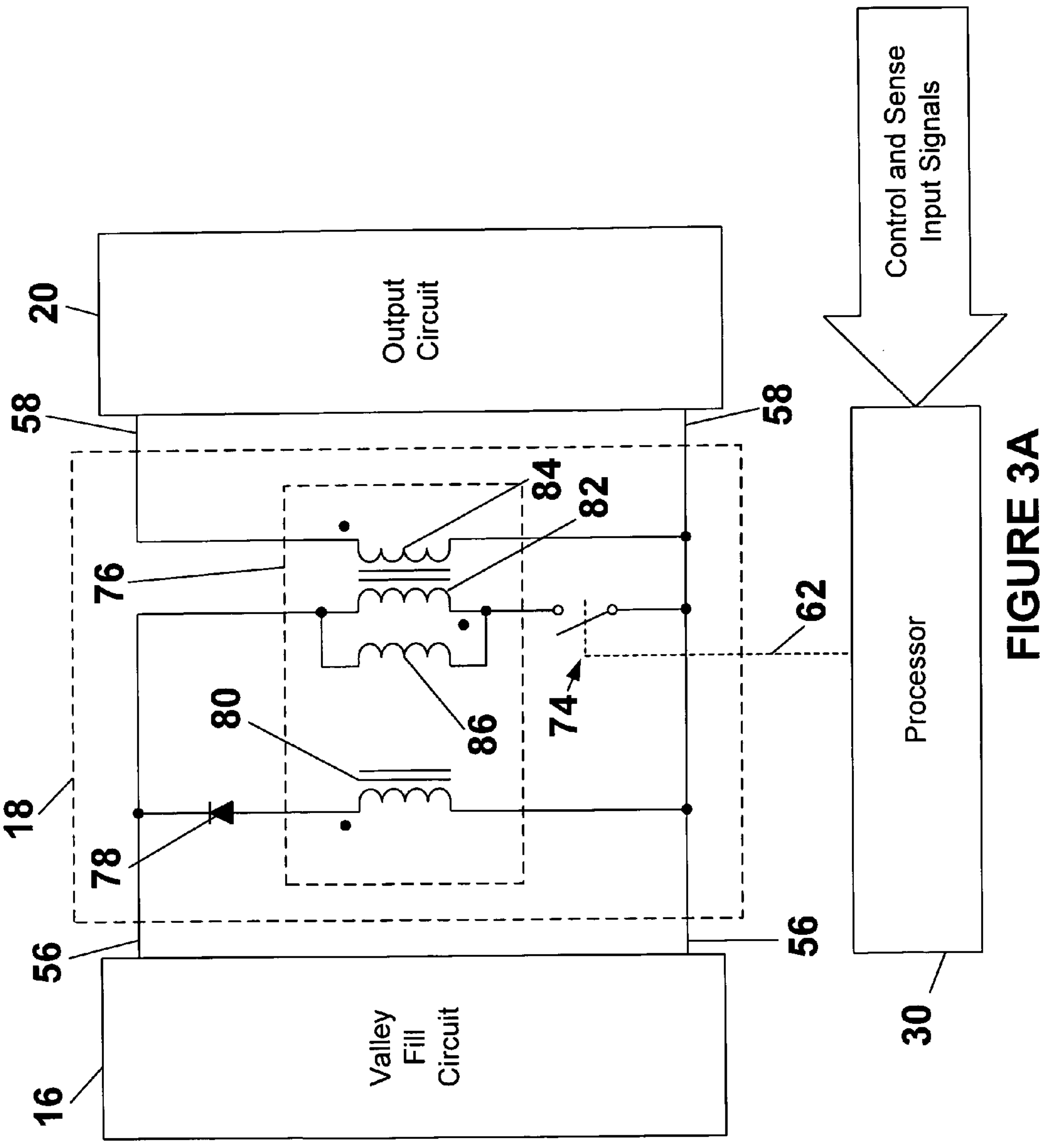
FIG. 3A is a simplified schematic of the inverter circuit coupled to the processor in accordance with an exemplary embodiment of the present invention.

FIG. 3A is a simplified schematic of the inverter circuit 18 coupled to the processor 30 in accordance with an exemplary embodiment of the present invention. The processor 30 receives control and sense input signals and provides a processor output signal 62 for controlling controllable conductive device 74 (e.g., switch) in the inverter circuit 18 for ultimately controlling at least one gas discharge lamp. Exemplary embodiments of controllable conductive device 74 include, but are not limited to, power MOSFETs, triacs, bipolar junction transistors, insulated gate bipolar transistors, and other electrical devices in which the conductance between two current carrying electrodes can be controlled by means of a signal on a third electrode. Electrical power is provided to the inverter circuit 18 through the rectifying circuit 14 and valley fill circuit 16. The inverter circuit 18 converts the voltage provided by the valley fill circuit 16 into a high frequency AC voltage. The inverter circuit 18 includes a transformer 76, switch 74, and diode 78. The transformer 76 comprises at least two windings. For the sake of clarity, the transformer 18 is depicted in FIG. 3A as having three windings 80, 82, 84. The depiction of winding 86 in FIG. 3A is actually a magnetizing inductance and not a physical winding (described below). The switch 74 enables the conversion of the valley filled voltage signal 56 to a high frequency AC voltage signal 58. The high frequency AC voltage signal 58 is provided to the output circuit 20 to drive a lamp current through at least one gas discharge lamp.

In operation, the processor 30 provides control information via processor output signal 62 to control the conductive states of the switch 74. With the switch 74 closed (in a conductive state), the valley filled voltage signal 56 is provided to the winding 82 of the transformer 76. For the sake of clarity, the magnetizing inductance of transformer 76 is shown as a separate winding 86, although it is not physically a separate winding. The voltage applied to winding 82 allows current to flow through winding 82 resulting in charging of the magnetizing inductance 86. With the switch 74 closed, the voltage applied to winding 82 is induced in the winding 84 in accordance with the turns ratio of the windings 82 and 84. This results in a voltage having a first polarity being provided to the output circuit 20. Also, with the switch 74 being closed, a voltage is induced in the winding 80. However, the diode 78 is reverse biased during this state due to the winding convention of transformer 76 as indicated by the dot convention in FIG. 3A. Switch 74 remains in a conductive state (closed) until the processor 30 via processor output signal 62 commands a change of state of the switch 74.

In a second state, the switch 74 is commanded to be open (non-conductive) by the processor 30 via processor output signal 62. When this occurs, current-flow through the winding 82 is disabled. However, current-flow through the magnetizing inductance 86 cannot instantly stop flowing, rather this current-flow is modified in accordance with the rate of change of the current flow through the winding 82 (i.e., V=L dI/dt). This forces the magnetizing inductance 86 to become a voltage source driving transformer 76 in a polarity opposite to that which existed when switch 74 was closed (conductive). During this non-conductive state while switch 74 is open, the polarity reversal of the voltage on the winding 82 by the magnetizing inductance 86 drives a like reversal on the windings 80 and 84. With this polarity reversal, the winding 84 provides the output circuit 20 with the high-frequency AC voltage signal 58 having a voltage of opposite polarity as compared to the conductive state (switch 74 closed). The polarity reversal of the second state (switch 74 open) now drives the winding 80 with a voltage of polarity capable of forward biasing the diode 78. If the value of the voltage on the winding 80 is greater than the value of the voltage of the valley filled voltage signal 56, then diode 78 is forward biased. With diode 78 forward biased, the voltage on winding 80 is limited to the value of the voltage of the valley filled signal 56. The winding 80 therefore acts as a clamp winding for the transformer 76. The limiting of voltage on winding 80 has a corresponding limiting effect on all the windings of transformer 76. The limiting of voltage on the winding 82 of transformer 76 has the advantageous effect of losslessly limiting the voltage stress on switch 74 during this second state. The limiting of voltage on the winding 84 has the advantageous effect of applying a well defined voltage to the output circuit 20 during this second state. The inverter circuit 18 returns to the conductive state after completing the non-conductive state, and the voltage applied to the output circuit 20 is constrained and defined in both states.

Figure 3B:
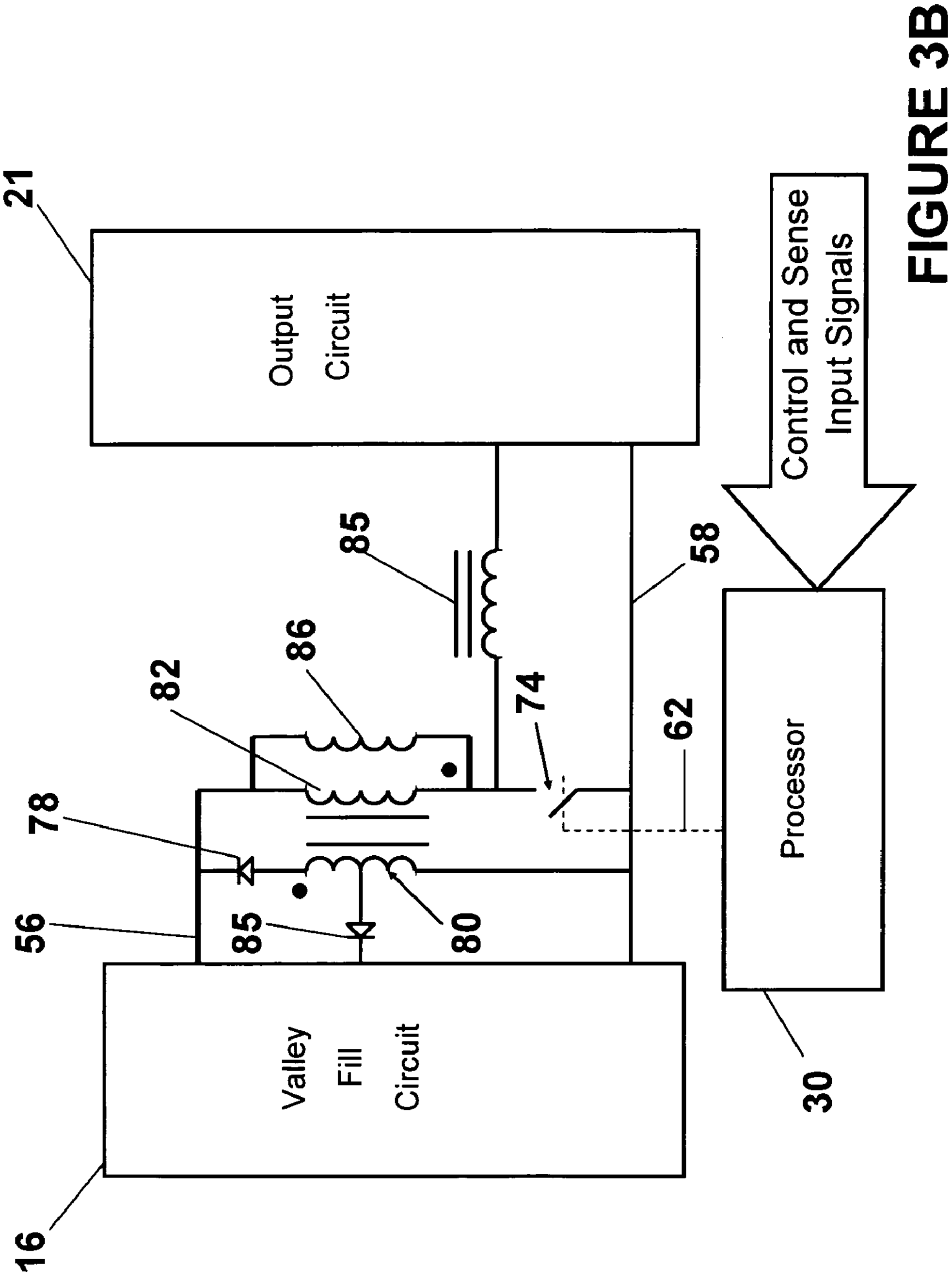
FIG. 3B is a simplified schematic of the inverter circuit coupled to the processor in accordance with an alternative exemplary embodiment of the present invention.

An alternative embodiment of the inverter and its connection to the output circuit is shown in FIG. 3B, where the output of the inverter at common point between the switch 74 and the winding 82 is connected directly to a terminal of the inductor 85 which comprises an integral part of the output circuit. The charging of the magnetizing inductance 86 when the switch 74 is commanded to be closed is the same as described above. Also the clamping action of winding 80 and diode 78 proceeds in the same manner as described above.

In one embodiment of the invention, the processor 30 directly controls the inverter 18 by providing a digital signal that controls the instantaneous on/off state of the inverter switch(es). The duty cycle and frequency of this signal are substantially the same as the resulting duty cycle and frequency of the inverter. It is to be understood, however, that this does not imply that the controlling device directly drives the switch(es) in the inverter. It is common to have a buffer or driver between the controlling device and the switches. A purpose of the driver is to provide amplification and/or level shifting. In an exemplary embodiment, the driver does not significantly alter duty cycle or frequency.

When the inverter switch 74 is closed and the magnetizing current begins to linearly increase, it is desired to open the switch 74 and interrupt the flow of current therethrough when the current reaches a specified threshold level. However, because there are components of current through the inverter switch 74 other than the one to be measured, it is not always possible to measure the magnetizing current by directly measuring the current through the switch 74. In an embodiment of the present invention, the processor 30 modulates the pulse width of the processor control signal 62 to control the opening and closing of the inverter switch 74 utilizing a computational model of the magnetizing inductance to determine when the desired threshold level is obtained. The value of magnetizing current is computed and the estimated time at which the computed magnetizing current will reach the threshold value is predicted. The processor 30 receives an indication of the instantaneous voltage value of the full wave rectified voltage signal 54 (or alternatively the input power signal 60) via sense signal 38. The processor 30 utilizes this instantaneous voltage value (or a value proportional to the actual instantaneous voltage value) in conjunction with the computational model described above to compute the time at which the current through the switch 74 will reach the desired threshold value.

In an exemplary embodiment of the invention, this computation is implemented as follows. Each time the processor computes a correction term, y(n), in the lamp current control loop, it will compute another term in accordance with the equation $$PW(n) = \frac{K * y(n)}{V_{VF}},$$

where PW(n) is proportional to the pulse width or duty ratio of the inverter switch, K is a scaling constant, $V_{VF}$ is the sampled value of the valley-fill bus voltage, and n is an integer index indicating one of many sequential values of y and the associated value of PW.

The switch 74 is controlled by the processor 30 at a frequency derived from the processor's 30 clock oscillator frequency and by a duty ratio as set by the ballast control loop.

The processor 30 performs several functions in addition to controlling the inverter switch 74 to control the output light level of at least one gas discharge lamp. Some of these functions include: sampling input signals, filtering input signals, supervising ballast operations and facilitating state transitions of the ballast, detecting ballast fault conditions, responding to fault conditions, receiving and decoding data provided via the bidirectional communications interface, and encoding and transmitting data via the bidirectional communications interface. The processor 30 also determines lamp current levels in accordance with respective commanded levels on each of the ballast input signals provided to the control input terminals, the relative priority of the ballast input signals, and sequence of activation of the ballast input signals.

Input signals, such as the ballast input signals 34, are sampled and filtered as needed to achieve a desired transient response of the ballast control circuitry via a digital filter(s) implemented on the processor 30. Each digital filter approximates the performance of analog filters that have been demonstrated to provide stable operation of gas discharge lamps over required operating conditions. Utilization of digital filters provides the capability to tailor the performance of the ballast control loop for different operating conditions and loads. Key filter parameters are controlled by numerical coefficients that are stored in memory in the processor 30. These filter coefficients are alterable, allowing modification of filter characteristics. For example, in one embodiment the analog phase control ballast input signal is sampled to provide a digital signal. This digital signal representation of the analog phase control signal is digitally filtered using a second order digital filter having performance characteristics similar to analog filters utilized to perform comparable functions.

In an embodiment of the present invention, the processor 30 receives data from the IR signal in the form of a digital bit stream. The bit streams are conditioned by interface circuits and/or the processor 30 to have voltage amplitudes and levels that are compatible with the processor's 30 input requirements. The processor 30 processes data encoded in the IR ballast input signal. The encoded data includes commands such as: turn the lamp on, turn the lamp off, lower the output light level of the lamp, and select a preset output light level. Examples of systems employing ballasts receiving IR signals are disclosed in U.S. Pat. Nos. 5,637,964, 5,987,205, 6,037,721, 6,310,440, and 6,667,578, the entireties of which are hereby incorporated by reference, and all of which are assigned to the assignee of the present application.

The processor 30 receives and transmits data via the communications interface in the form of digital bit streams, which in an exemplary embodiment conform to the Digital Addressable Lighting Interface (DALI) standard. The DALI standard is an industry standard digital interface system using a digital 8 bit code to communicate dimming and operational instructions. It is to be understood that non-standard extensions of the DALI protocol and/or other serial digital formats can be used as well.

Figure 4:
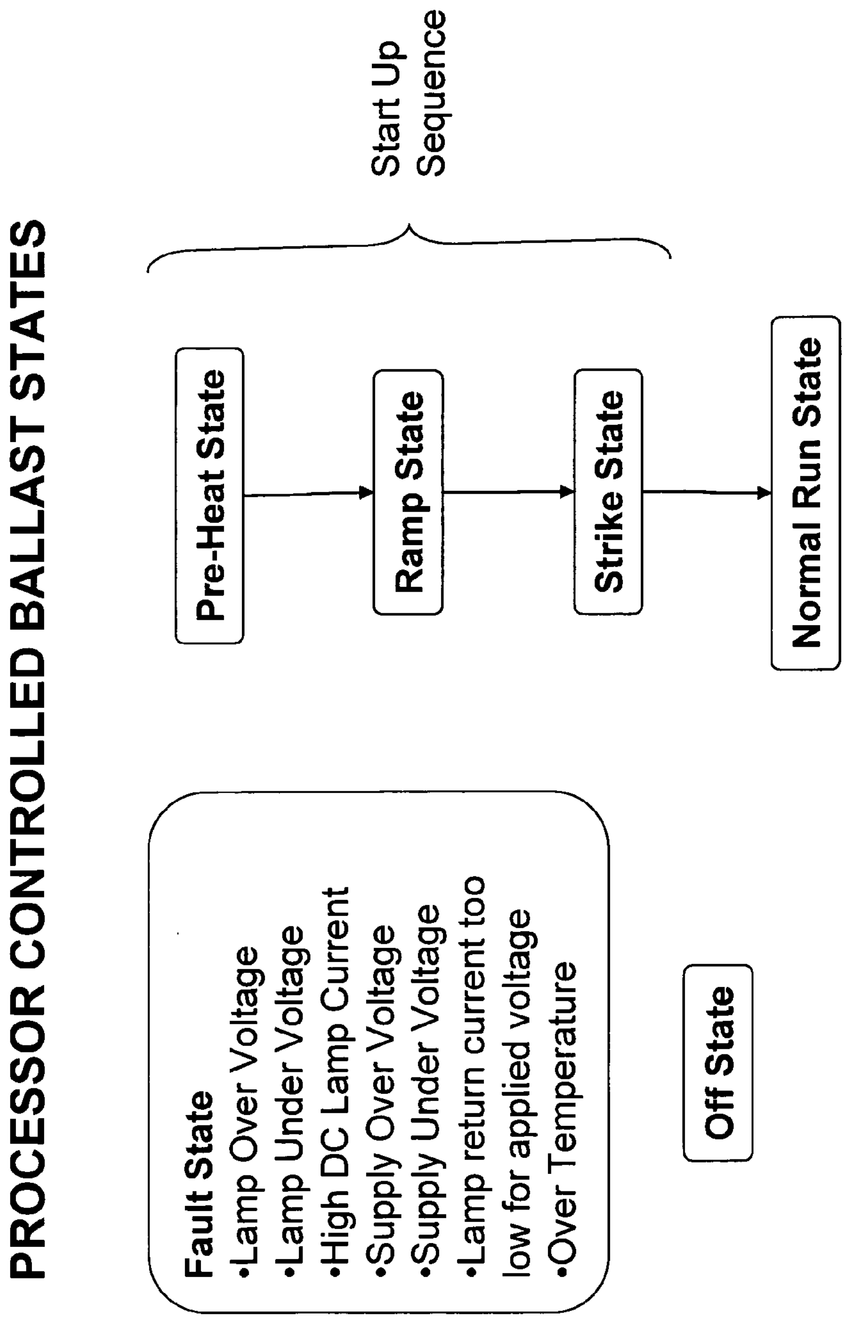
FIG. 4 is a diagram depicting various processor controlled ballast states in accordance with an exemplary embodiment of the present invention.

FIG. 4 is a diagram depicting various processor controlled ballast states in accordance with an exemplary embodiment of the present invention. Ballast supervisory functions are performed by the processor 30 by running a portion of processor resident software referred to as the "ballast state machine". The ballast state machine program controls the start-up sequence of heating the gas discharge lamp filaments (pre-heat state), increasing the voltage applied to the lamps over a programmed interval (ramp state) to strike an arc (strike state). The processor 30 running the ballast state machine program determines if the lamp has started via sense signal 46 from the current sense circuit 28. After properly striking an arc, the ballast is in the normal run state. During the normal run state, the ballast state machine program of processor 30 determines if the lamps and control circuits are operating properly or if a fault condition exists via sense signals from the various implemented sensors (e.g., sense signals 38, 42, 46, 47). If it is determined that a fault condition exists, the ballast state machine program determines an appropriate action dependent upon the type of fault. Example fault conditions monitored by the processor 30 include: lamp voltage too high, lamp voltage too low, DC component of the lamp current too large, lamp return current too low for the applied voltage, supply voltage too high, supply voltage too low, and internal temperature of the ballast too high.

Figure 5:
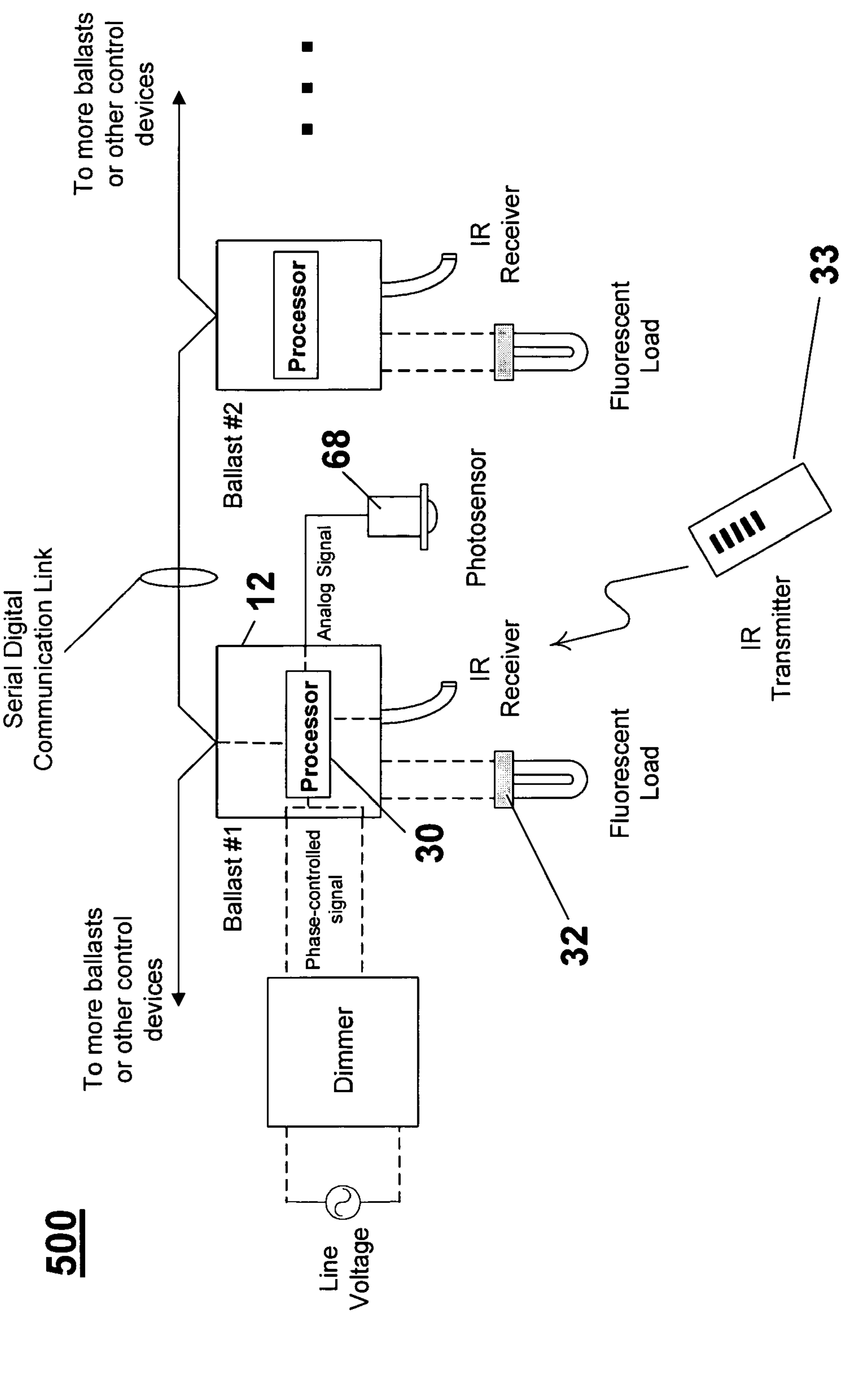
FIG. 5 is a diagram of a distributed ballast system in accordance with an exemplary embodiment of the present invention.

FIG. 5 is a diagram of a distributed ballast system 500 in accordance with an exemplary embodiment of the present invention. The system 500 includes at least two ballasts 12 having respective processors 30 therein. For the sake of clarity, only ballast #1 is labeled with identification numbers. Each ballast 12 and each processor 30 are as described above. The plurality of processors 30 are coupled via the communications interface also as described above. In one embodiment of the present invention, the communications interface is a serial digital communications link capable of transferring data in accordance with the DALI standard.

The serial digital communications interface (link) is bidirectional, and an incoming signal can comprise a command for a ballast to transmit data via the serial digital communications interface about the current state or history of the ballast's operation. The ballast can also use the serial digital communications interface to transmit information or commands to other ballasts that are connected to that ballast. By utilizing the ballast's ability to initiate commands to other ballasts, multiple ballasts can be coupled in a distributed configuration. For example, ballast #1 can receive a command from an IR transmitter 33 via ballast #1's IR interface to turn off all lamps of the system 500. This command is transmitted to other ballasts in the system 500 via the communications interface. In another embodiment the ballasts of the system 500 can be coupled in a master-slave configuration, wherein the master ballast receives one or more signals from a central controller or from a local control device, and sends a command or commands to other lighting loads to control the operation of the other lighting loads, or synchronize the operation of the other lighting loads with itself. The master ballast may also send commands and/or information pertaining to its configuration to other control devices, such as central controllers or local controllers. For example, a master ballast may send a message containing its configuration to other controllers and/or ballasts indicating that it reduced its light output power by 50%. The recipients of this message (e.g., slave devices, local controllers, central controllers) could independently decide to also reduce their respective light output power by 50%. The phrase lighting loads includes ballasts, other controllable light sources, and controllable window treatments such as motorized window shades. Ballasts and other controllable light sources control the amount of artificial light in a space while controllable window treatments control the amount of natural light in a space. The central controller may be a dedicated lighting control or may also comprise a building management system, A/V controller, HVAC system, peak demand controller and energy controller.

In an exemplary embodiment of the system 500, each ballast is assigned a unique address, which enables other ballasts and/or a controller to issue commands to specific ballasts. The infrared capable terminals on each processor of each ballast can be utilized to receive a numerical address which is directly loaded into the ballast, or can serve as a means to "notify" a ballast that it should acquire and retain an address that is being received on a digital port. Generally, a port comprises interface hardware that allows an external device to "connect" to the processor. A port can comprise, but is not limited to, digital line drivers, opto-electronic couplers, IR receivers/transmitters, RF receivers/transmitters. As known in the art, an IR receiver is a device capable of receiving infrared radiation (typically in the form of a modulated beam of light), detecting the impinging infrared radiation, extracting a signal from the impinging infrared radiation, and transmitting that signal to another device. Also, as known in the art, an RF receiver can include an electronic device such that when it is exposed to a modulated radio frequency signal of at least a certain energy level, it can respond to that received signal by extracting the modulating information or signal and transmit it via an electrical connection to another device or circuit.

As described above, each of the multiple control inputs of each processor 30 is capable of independently controlling operating parameters for the ballast 12 in which the processor 30 is contained, and for other ballasts in the system 500. In one embodiment, the processor 30 implements a software routine, referred to as a set point algorithm, to utilize the information received via each of the input terminals, their respective priorities, and the sequence in which the commands are received. Various set point algorithms are envisioned.

Figure 6:
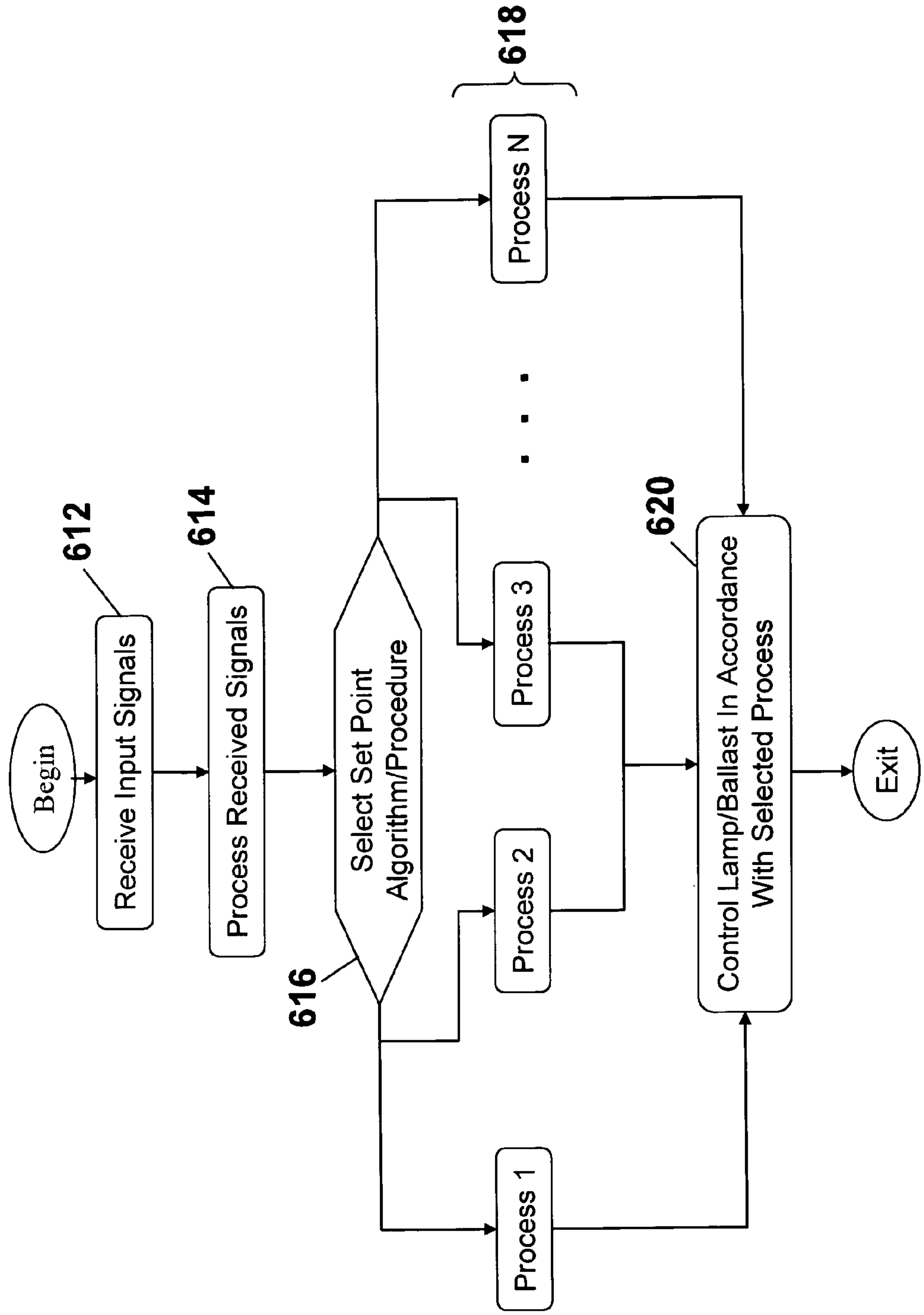
FIG. 6 is a flow diagram of a process for controlling a gas discharge lamp with a processor controlled ballast utilizing selected set point algorithms in accordance with an exemplary embodiment of the present invention.

FIG. 6 is a flow diagram of a process for controlling a gas discharge lamp with a processor controlled ballast utilizing selected set point algorithms in accordance with an exemplary embodiment of the present invention. Ballast input signals are received by the processor of the ballast at step 612. The received signals are processed in a known manner (e.g., sampled, quantized, digitized) at step 614. If a set point procedure (algorithm) has not been previously selected, one is selected at step 616. If a set point procedure has been selected, then step 616 directs the process to the selected set point procedure. The selected set point procedure is adhered to at step 618 and the ballast and lamp are controlled in accordance with the selected set point procedure at step 620. Example set point algorithms include: (1) Multiply the commanded levels received via each ballast input signal together to obtain the target level (desired lamp light level); (2) Choose the lowest of the commanded levels received via the ballast input signals as the target level; (3) Choose the most recently changed ballast input signal as having highest priority to set the target level; and (4) Assign a specific processor terminal the highest priority, such as signals received via the communications interface, and process the remaining inputs in accordance with one of the above described set point algorithms. The processor 30 can be programmed with other combinations of priority and sequence. In an embodiment of the present invention, multiple set point algorithms are stored in processor 30 memory. One of the multiple set point algorithms is selected at the time of manufacture, sale, installation, and/or during operation.

Figure 7:
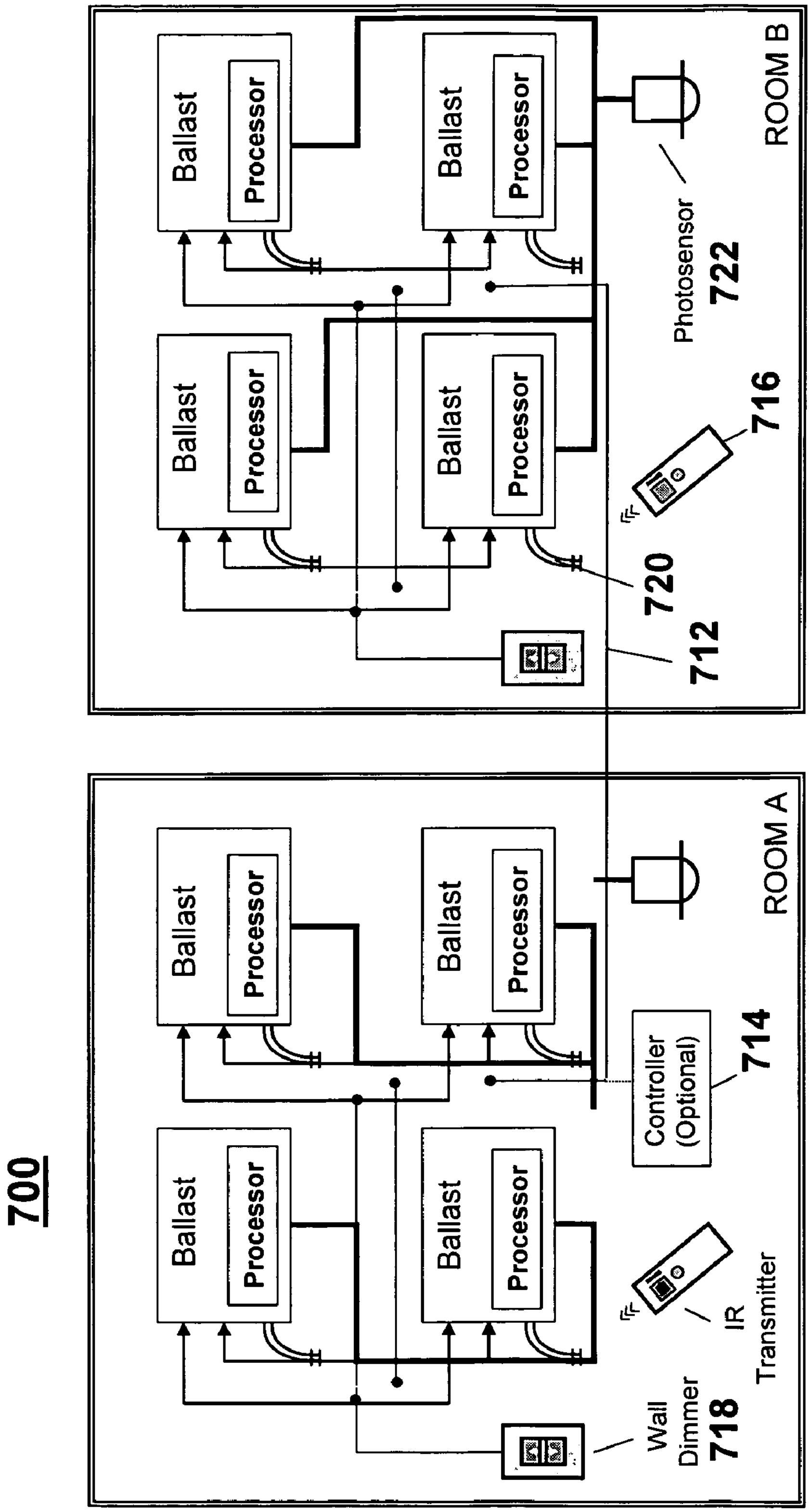
FIG. 7 is a diagram of a processor controlled ballast system configured for a two room application in accordance with an exemplary embodiment of the present invention.

FIG. 7 is a diagram of a processor controlled ballast system 700 configured for a two room application in accordance with an exemplary embodiment of the present invention. The system 700 depicts two rooms for clarity; however the system 700 is applicable to any number of rooms. The system 700 comprises eight ballasts, each ballast comprising a processor. The ballasts and the rooms are coupled to each other via communications interface 712. Optional controller 714 also is coupled to the ballasts via the communications interface 712. As described above, each ballast can respond to local commands (command for the specific ballast), global commands (commands for all ballasts), group commands (commands for all ballasts in a group), or a combination thereof. Each room has a wall dimmer 718 and photosensor 722. Each ballast has an infrared detector 720. Individual ballasts are controllable by the IR remote transmitter 716 via the IR detector 720.

The ballasts and thus the lamps can be controlled by the optional controller, by the individual ballast input signals, or a combination thereof. In an exemplary embodiment, each room is individually controlled by its respective wall dimmer 718, and when the rooms are coupled together, controlled by the optional controller. In another embodiment, the optional controller is representative of a building management system coupled to the processor controlled ballast system via a DALI compatible communications interface 712 for controlling all rooms in a building. For example, the building management system can issue commands related to load shedding and/or after-hours scenes.

An installation of several ballasts and other lighting loads can be made on a common digital link without a dedicated central controller on that link. Any ballast receiving a sensor or control input can temporarily become a "master" of the digital bus and issue command(s) which control (e.g., synchronize) the states of all of the ballasts and other lighting loads on the link. To insure reliable communications, well known data collision detection and re-try techniques can be used.

Figure 8:
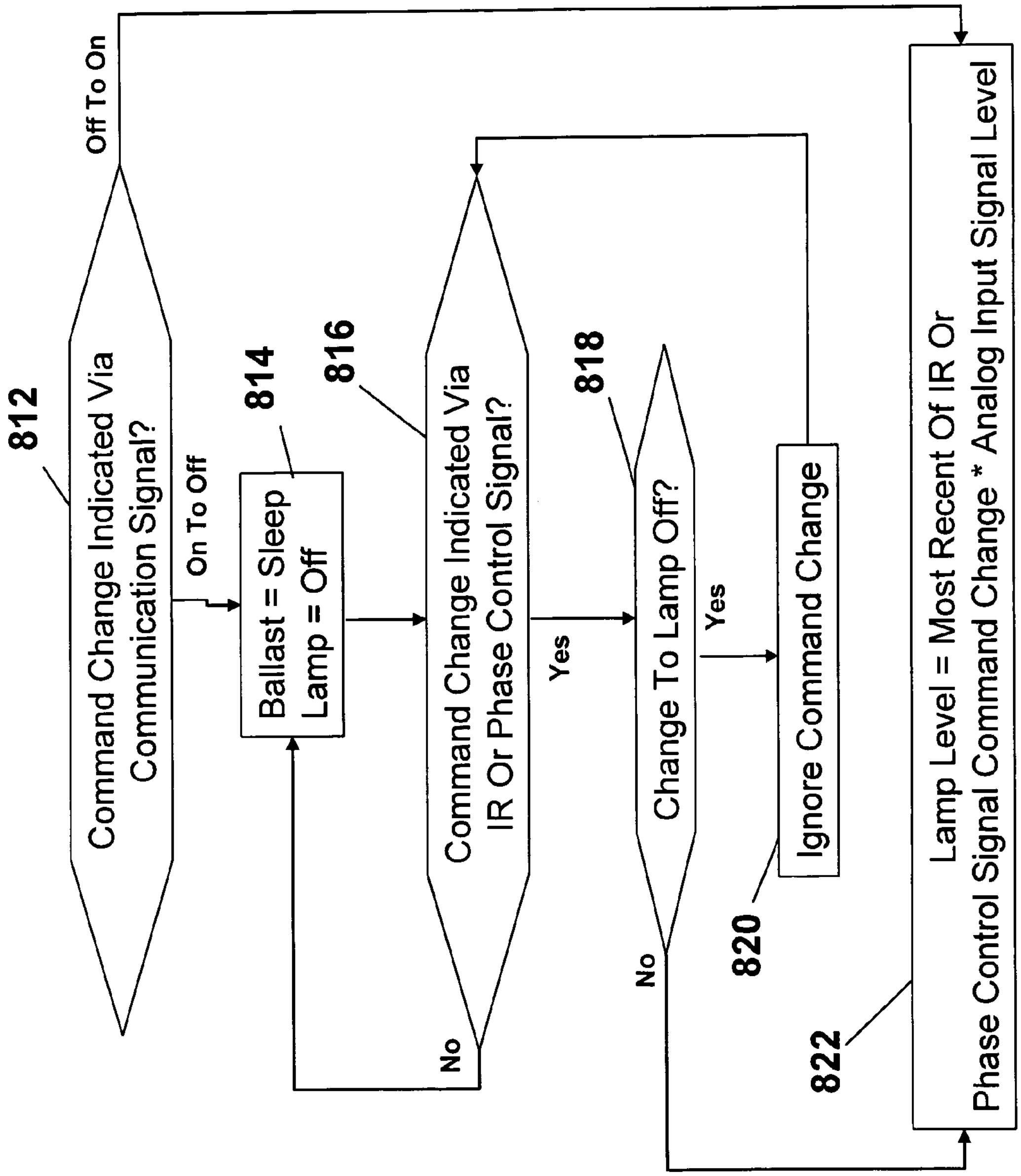
FIG. 8 is a flow diagram of a set point procedure in accordance with an exemplary embodiment of the present invention.

FIG. 8 is a flow diagram of a set point procedure in accordance with an exemplary embodiment of the present invention. As described above, lamps are controlled in accordance with selected procedures (referred to as set point algorithms) that incorporate the priorities and sequence of the information on the ballast input signals. At step 812, the processor determines if the command indicated by the communications input signal has changed. If the indicated change is from lamp on to lamp off, then at step 814, the ballasts go into the sleep state and the lamp is off until a change in command is indicated by the IR input signal or the phase control input signal at step 816. However, if commands via the IR input signal or the phase control input signal indicate the lamp is to be turned off (step 818), this change is ignored at step 820, because at this point, the lamp is already off. Returning to step 812, if the indicated command change is from lamp off to lamp on, then at step 822, the lamp level is set to the level indicated by the analog input signal times the level indicated by the most recent command change indicated by the IR input signal or the phase control input signal.

In an exemplary scenario, the system 700 is placed in an after hours mode during portions of a day (e.g., between 6:00 P.M. and 6:00 A.M.). When in the after hours mode, the processors of the ballasts can receive commands via the communications interface to turn the lamps off Subsequently the lamps can be turned on and adjusted with the IR remote transmitter via the IR input signal or with the wall dimmer via the phase control input signal even if the command provided via the communications signal indicate that the lamps are to be off. The lamps remain at the level set by the most recently changed of the phase control or IR input signals until one or the other changes, or until the a command issued via the communications signal is other than turn the lamps off.

In an exemplary operating mode (other than the after hours mode), the most recently received command level, via the communications interface, sets the upper limit of the lamp arc current. Changes in the communications interface commanded level scale the light level accordingly. If the IR input signal has been used to set lamps at different levels, those lamps maintain their relative differences as the levels are scaled by the communications interface commands. An individual ballast/lamp(s) combination, i.e., fixture, can be dimmed up or down with the IR input. A subsequent change in the phase control input signal overrides the IR input signal commanded level, and all fixtures in that room go to the level commanded by the phase control input signal scaled by the communications signal indicated upper limit and the analog input. A photo sensor (e.g., 722) coupled to the analog input signal processor terminal controls the light level at the set point of the photo sensor unless the communications interface commanded level in combination with the phase control input signal or the IR input signal set the light at a level such that the analog input signal can not bring it up to the photosensor set point. In that case, the analog input signal is pegged at its upper limit, and the level is be controlled by the other inputs signals.

The multiple-input ballast having a processor therein for controlling a gas discharge lamp in accordance with the present invention combines system level control and personal level control within the ballast. This enables lamp fixture installations to be designed such that global control and local, personal control, of lighting is combined in the ballast. This reduces response latency and provides tailored control inputs and increased system design flexibility. The processor of the multiple-input ballast utilizes software/firmware routines for setting the lamp arc current level as a function of multiple and varying command provided by the multiple input signals. The routines determine a commanded set point of the lamp arc current by combining the signals on each of the processor terminal inputs. This programmable approach allows for flexibility in designing set point algorithms and implemented complexity. This programmable approach also allows for growth to include larger sets of set point algorithms. Also, program can be designed to dynamically react to faults and to perform built in tests and diagnostic checks.

Further, set point algorithms can be altered and/or selected in the field. Different set point algorithms may be optimal for different applications. For example, a given control input in one application can be used for local or personal control, and the same control input in a different application can be used for building-wide or large area control. By means of unique commands on one of the inputs, parameters or flags can be set in the processor's memory to select the proper set point algorithm. Alternatively, the digital serial interface can be used to load the required program for each application.

In a typical prior art ballast of the type containing an active power factor correction front end, the voltage applied to the inverter circuit is substantially DC. As a result, the control circuit that controls the inverter can be relatively slow as it only needs to compensate for variation in components and changes in lamp dynamics due to factors such as temperature and age.

In an exemplary embodiment of the present invention, the valley fill circuit 16 provides a valley filled voltage signal 56 to the inverter circuit 18. It is not uncommon for the valley filled voltage signal 56 to have significant AC ripple. To control the inverter 18 the processor 30 varies the conduction time of the controllably conductive switch 74 to compensate for the significant ripple on the valley filled voltage signal 56. To compensate for the ripple, the processor samples the valley filled voltage signal via the sense circuit 26 sufficiently fast such that the error between the sample being used and the actual voltage is relatively small. In an exemplary embodiment, a sampling rate of approximately 10 kHz is utilized.

In one exemplary embodiment of the ballast 12, the processor 30 comprises a single analog to digital converter (ADC). An example of such a processor is the PIC18F1320 microcontroller manufactured by Microchip Technology Inc. of Chandler, Ariz. The PIC18F1320 has a built in ADC that is used to sample analog inputs. In accordance with known theory, to sample a signal, such as the valley filled voltage signal 56 for example, at a 10 kHz sample rate, preferably one sample is taken every 100 s. In addition to sampling the valley filled bus voltage 56 via the sense circuit 26 and the sense signal 42, also sampled are various other sense signals (e.g., sense signals 38, 46, 47) and the ballast input signals 34. Some of these signals are digital and can be applied to the general purpose ports of the PIC18F1320, however several of the signals are analog and utilize an ADC. The PIC18F1320 has multiple digital inputs, but only one analog to digital converter that is shared by all of the inputs. As a result, only one analog input can be sampled at a time. As known in the art, analog to digital converters requires a finite amount of time to sample an analog voltage and provide a digital representation of that voltage. The PIC18F1320 requires approximately 32 s to perform a conversion. At most the PIC18F1320 can sample 3 analog inputs in approximately 100 s. This means that it is not possible to sample all of the desired analog signals within the sampling period of 100 s.

Figure 9:
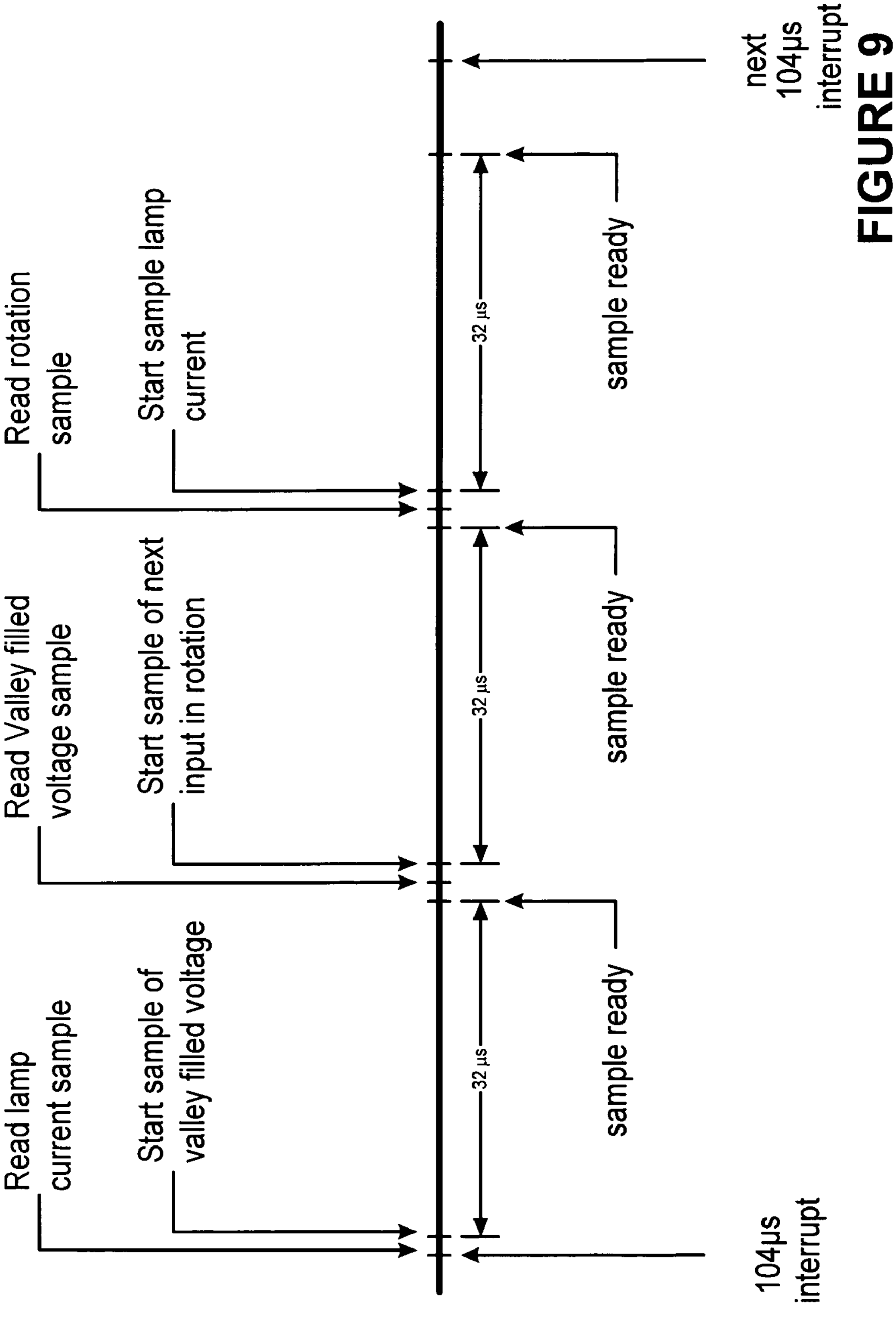
FIG. 9 is a timing diagram for an analog to digital sampling method in accordance with an exemplary embodiment of the present invention.

FIG. 9 is a timing diagram depicting alternate sampling of signals in accordance with an exemplary embodiment of the present invention. The sampling period of the timing diagram shown in FIG. 9 is 104 s. As shown, both the lamp current sense signal 46 and the valley filled voltage signal 56 via the sense signal 42 are sampled during one sampling period. This leaves one sampling point to be shared between the other analog signals. In an exemplary embodiment, this third sampling point alternates between sampling the lamp voltage sense signal 47 and the analog ballast input signal 34*c*. In this embodiment, the valley filled voltage signal 56 via the sense signal 42 and the lamp current sense signal 46 are sampled at approximately 10 kHz and the lamp voltage sense signal 47 and the analog input signal 34*c* are sampled at approximately 5 kHz. Of course it would be possible to add additional signals into the rotation at the third sampling point. If all of the rotated signals appear just once in the rotation, the sampling rate for these signals would be 10 kHz divided by the number of rotated signals. Of course there is no reason that a rotated signal must appear only once in the rotation. For example, given three signals A, B and C, the rotation could be ABAC such that signal A is sampled at twice the rate of signals B or C.

In the embodiment shown in FIG. 9 the actual sampling period is 104 s. This period is sufficient to allow three analog to digital samples per period. In addition, this sampling period is convenient for receiving DALI commands since the half-bit period of the DALI protocol is 416 s. Sampling the DALI port once per 104 s sampling period gives a total of 4 samples per half-bit and thus 8 samples per bit. Multiple samples per bit are advantageous because the DALI communication link and the ballast control loop are not synchronized.

In an exemplary embodiment, the desired sampling period for the IR ballast input signal (e.g., signal 34*d*) is 572 s. However, 572 s is not an integer multiple of the control loop sampling period of 104 s. One approach is to sample the IR ballast input signal alternately every $5^{th}$ or $6^{th}$ pass through the control loop sampling time. This results in an average sampling time of 572 s.

Figure 10A:
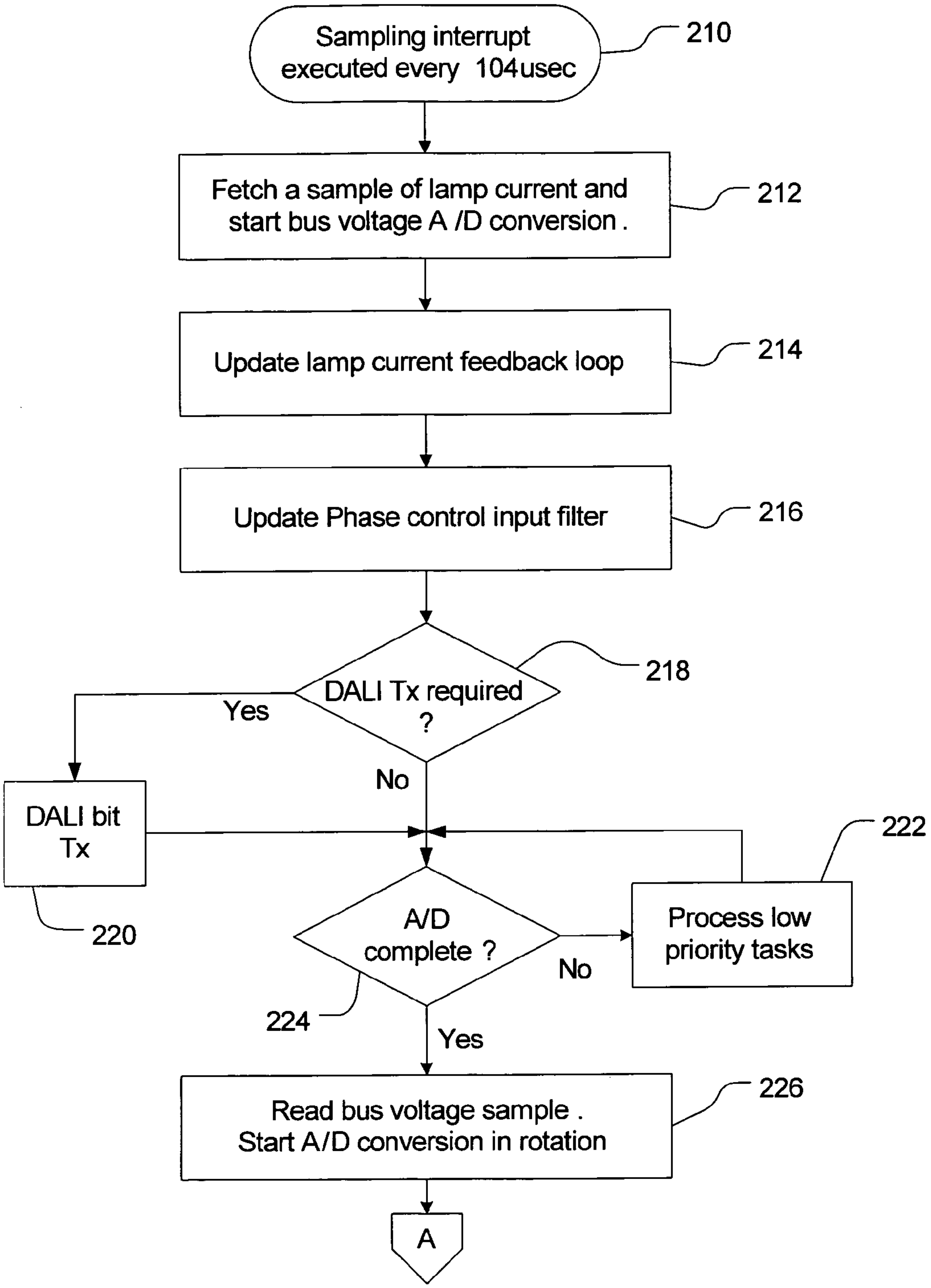
FIGS. 10A and 10B are a flow diagram of a process for controlling input sampling in accordance with an exemplary embodiment of the present invention.
Figure 10B:
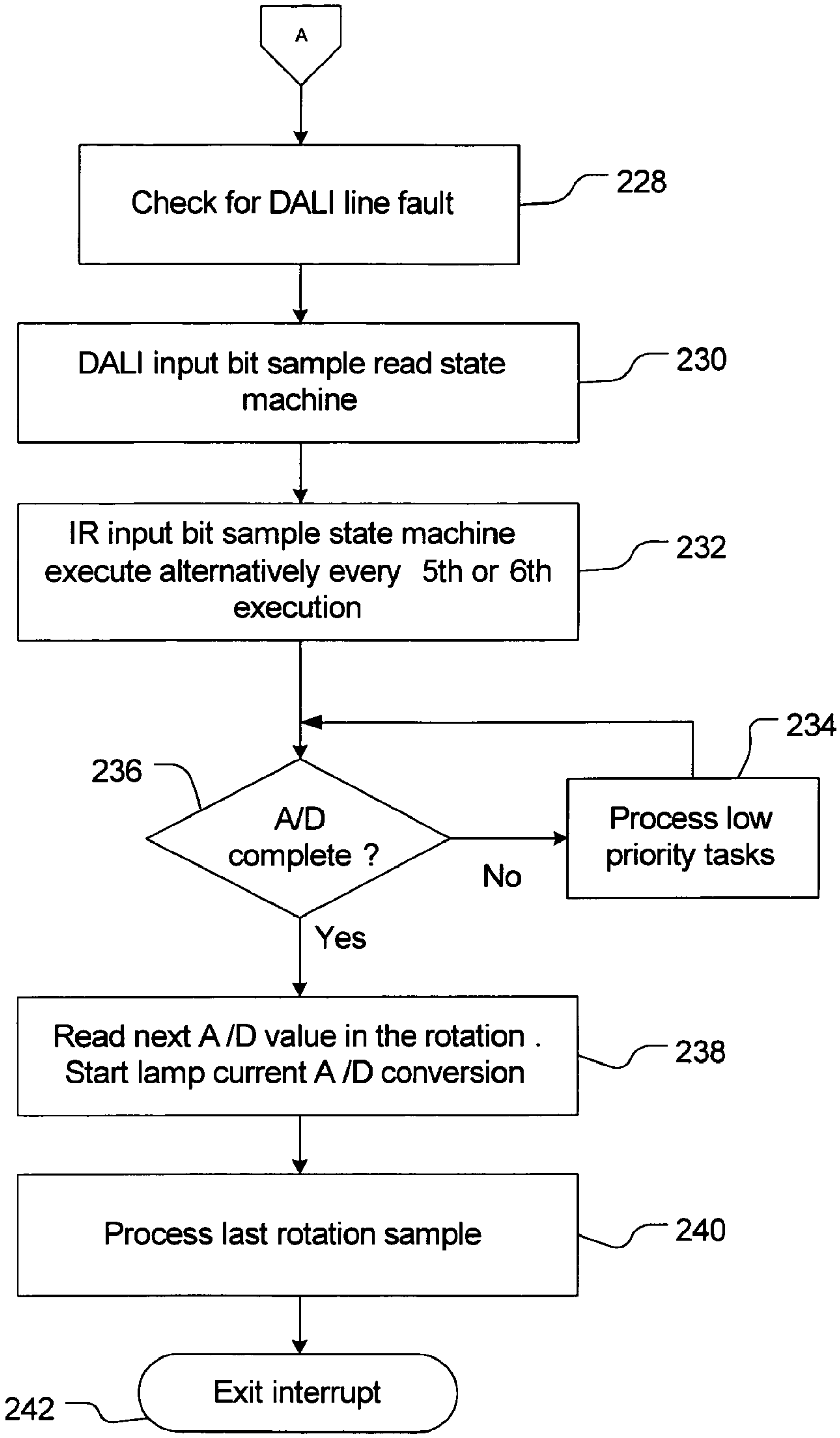

FIG. 10A and FIG. 10B are a flowchart of an interrupt service routine in accordance with an exemplary embodiment of the present invention. A timer in the PIC18F1320 is setup to trigger an interrupt every 104 s. When this interrupt occurs, an interrupt service routine is called. FIG. 10A and FIG. 10B show a flowchart for this interrupt service routine. In an exemplary embodiment, this service routine controls the sampling shown in FIG. 9 and also handles sending and receiving DALI bits via the communications signal (port 34*b*) and the IR signal (port 34*d*).

The entry point for the routine is at step 210. At step 212, the processor fetches and stores the last sample from the analog to digital converter (ADC). This sample is a sample of the current sense signal 46. After fetching this signal, the processor configures and starts the ADC to read the valley filled voltage signal via sense signal 42. As previously described, this sample will not be available for approximately 32 s so the processor has time for other tasks. In the next step 214, the processor updates the lamp current feedback loop using the latest samples of current sense signal 46 and the valley filled voltage sense signal 42. This control loop is implemented using well known digital control methods. In step 216, the processor updates the phase control input filter. This filter is implemented as a digital low pass filter. The output of this filter represents the duty cycle of the phase control input. The input to the phase control input filter is determined as follows. Every time the 104 s interrupt routine reads an ADC value it also reads the state of the phase control input 34*a*. This input will be either a 1 or a 0. The first time this input is sampled during the 104 s interrupt it is given a weight of 47 while the following two samples receive a weight of 40. These weights are based on how much time has passed since the port was last read. At the end of a first pass through the 104 s interrupt, the sum of these weighted samples is between 0 and 127. At the end of a second pass through the 104 s interrupt the sum of all of the weighted samples from current and previous 104 s interrupt will be between 0 and 254. It is this sum that is provided to the phase control input filter.

At step 218 the processor checks to see if a DALI message is in the process of being sent. If so, the processor goes to step 220 where it determines the proper state of the DALI output port. At step 224 the processor checks to see if the latest ADC sample is ready. If the sample is not yet ready, the processor proceeds to step 222 where it executes one of a sequence of low priority tasks. After completing a low priority task it goes back to step 224 to recheck the status of the ADC. As long as the ADC is not ready, the processor continues the loop of executing one of a sequence of low priority tasks at step 222 and then rechecking the ADC at step 224. Once it is determined that a new ADC sample is ready, the processor moves to step 226 where it fetches this new sample and saves it as the latest sample of the valley filled voltage signal 42. The processor then sets up and starts then next ADC sample. As previously described this next sample may be one of a rotation of inputs. In an exemplary embodiment, this sample point alternates between a sample of the lamp voltage sense signal 47 and the analog input signal 34*c*. After starting this conversion, the processor proceeds to step 228 where it checks for faults on the DALI port. Next at step 230 the processor reads and stores the current state of the DALI input port. It then uses this sample along with previous samples to recognize incoming messages. At step 232 the processor checks to see if it is time to sample the IR input signal 34*d*. As previously described, the IR port is not read on every pass through the 104 s sample period, but is instead read alternately every $5^{th}$ or $6^{th}$ time it reaches this step. If it is time to sample the input, a sample is taken and saved in memory. At step 236 the processor checks to see if the latest ADC sample is ready. If the sample is ready it moves on to step 238. If the sample is not ready it proceeds to step 234 and the system operates in the same type of sequence as described for steps 224 and 222 where low priority tasks are executed between checks of the status of the ADC sample. At step 238 the latest ADC sample is fetched and stored in a memory location corresponding to the current input in the rotation. The ADC is then setup and started to sample the current sense signal 46. The resulting sample will be fetched in step 212 on the next pass through the interrupt service route At step 240 this latest rotation sample fetched in step 238 is processed and then the processor exits the interrupt service routine at step 242.

The multiple-input ballast having a processor therein provides bidirectional communication between the ballast and other devices, such as ballasts, other lighting loads, and controllers. This allows the ballast to initiate unsolicited transmissions to the other devices. Further, the ballast processor via the communications terminal is compatible with existing systems utilizing the DALI communications protocol, allowing the ballast to assume the role of master or slave. Also, the multiple-input ballast is addressable via the IR, or other, processor input terminal.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed is:

1. An electronic ballast for driving a gas discharge lamp, comprising:

an inverter for producing a high frequency drive voltage for driving a lamp current in said gas discharge lamp, said drive voltage having an operating frequency and an operating duty cycle;

a microprocessor electrically connected to said inverter for directly controlling said inverter to control said lamp current, said microprocessor operable to provide an output signal to said inverter, such that said operating frequency and said operating duty cycle of said drive voltage are substantially the same as a frequency and a duty cycle of said output signal; and a port in electrical communication with said microprocessor for sending a first message from said microprocessor comprising at least one command and for sending a second message from said microprocessor comprising at least one ballast configuration onto a communication link operable to connect said electronic ballast to at least one other electronic ballast connected to said communication link, wherein:

said microprocessor is operable to send the first message to said at least one other electronic ballast to control the operation of said at least one other electronic ballast, and to send the second message to said at least one other electronic ballast to inform said at least one other electronic ballast of its configuration to enable said at least one other electronic ballast to use said ballast configuration message to adjust its operation.

2. An electronic ballast for driving at least one gas discharge lamp, comprising:

an inverter circuit producing a high frequency drive voltage for driving a lamp current in said at least one gas discharge lamp, said drive voltage having an operating frequency and an operating duty cycle;

a microprocessor connected to said inverter, said microprocessor directly controlling said inverter to control said lamp current to a desired level, said microprocessor operable to provide an output signal to said inverter, such that said operating frequency and said operating duty cycle of said drive voltage are substantially the same as a frequency and a duty cycle of said output signal; and at least two ports connected to said microprocessor, each of said ports being capable of at least one of sending and receiving messages comprising at least one of a command and a ballast configuration, at least two ports connected to said microprocessor, wherein:

a first one of said at least two ports is adapted to be coupled to a digital communication link, said digital communication link operable to connect said electronic ballast to at least one other electronic ballast, said first port transmitting on to said digital communication link a ballast configuration message to inform said at least one other electronic ballast of the ballast configuration of said electronic ballast to enable said at least one other electronic ballast to adjust its operation based on said ballast configuration;

a second one of said at least two ports is adapted to receive a ballast control signal from a remote transmitter or a sensor to control operation of said electronic ballast, said microprocessor receiving said ballast control signal; and said microprocessor is operable to send a command over said digital communication link to said at least one other electronic ballast to control the operation of said at least one other electronic ballast in response to receiving said ballast control signal.

3. The electronic ballast of claim 1, wherein said inverter comprises a controllably conductive device, said microprocessor operable to control said controllably conductive device between conductive and non-conductive states to produce said drive voltage.

4. The electronic ballast of claim 3, wherein said microprocessor controls said controllably conductive device to said non-conductive state when a current through said controllably conductive device reaches a threshold level.

5. The electronic ballast of claim 4, wherein said inverter further comprises a transformer characterized by a magnetizing inductance, said microprocessor operable to use a computational model of said magnetizing inductance to determine when said current through said controllably conductive device reaches said threshold level.

6. The electronic ballast of claim 5, further comprising:

a rectifier for receiving an AC line voltage and producing a rectified voltage;

wherein said microprocessor receives a control signal representative of an instantaneous magnitude of said rectified voltage.

7. The electronic ballast of claim 6, wherein said microprocessor uses said control signal to compute the time at which said current through said controllably conductive device reaches said threshold level as part of said computational model.

8. The electronic ballast of claim 6, wherein said microprocessor computes said duty cycle of said output signal using said instantaneous magnitude of said rectified voltage.

9. The electronic ballast of claim 1, wherein said microprocessor is operable to receive a plurality of ballast sense signals.

10. The electronic ballast of claim 9, wherein said microprocessor is operable to determine if said gas discharge lamp has started in response to a ballast sense signal representative of the magnitude of said current through said gas discharge lamp.

11. The electronic ballast of claim 9, wherein said microprocessor is operable to determine, in response to said ballast sense signals, if said lamp is operating properly or if a fault condition exists.

12. The electronic ballast of claim 1, wherein said microprocessor controls pre-heating and striking said lamp.

13. The electronic ballast of claim 12, wherein pre-heating said lamp comprises heating filaments of said lamp, and striking said lamp comprises increasing a magnitude of said drive voltage over a programmed interval to strike an arc in said lamp.

14. The electronic ballast of claim 1, wherein said microprocessor is operable to transmit messages to a second ballast via said port.

15. The electronic ballast of claim 14, wherein said command comprises a command for said second ballast to control the operation of a second gas discharge lamp connected to said second ballast.

16. The electronic ballast of claim 1, wherein said ballast configuration comprises a light output level of said ballast.

17. The electronic ballast of claim 1, wherein said port is adapted to be coupled to a digital communication link.

18. The electronic ballast of claim 17, wherein said digital communication link comprises a DALI protocol link.

19. The electronic ballast of claim 1, wherein said port comprises an infrared transmitter.

20. The electronic ballast of claim 1, wherein said port comprises a radio frequency transmitter.

21. The electronic ballast of claim 1, wherein said microprocessor modulates the pulse width of said control signal to control said inverter.

22. The electronic ballast of claim 2, wherein a first one of said ports is adapted to be coupled to a digital communication link.

23. The electronic ballast of claim 22, wherein a second one of said ports comprises an infrared receiver for receiving infrared signals.

24. The electronic ballast of claim 23, wherein said digital communication link comprises a DALI protocol link.

25. The electronic ballast of claim 23, wherein said digital communication link comprises a radio frequency communication link.

26. The electronic ballast of claim 2, wherein the ballast input signal comprises an infrared electrical signal from an infrared transmitter.

27. The electronic ballast of claim 26, wherein the infrared electrical signal comprises a command to turn said gas discharge lamp on or off.

28. The electronic ballast of claim 2, wherein the ballast input signal comprises a radio frequency signal from a radio frequency transmitter.

29. The electronic ballast of claim 2, wherein the ballast input signal comprises a sense signal from a photosensor.

30. The electronic ballast of claim 2, wherein the ballast input signal comprises a signal from an occupancy sensor.

* * * * *

UNITED STATES PATENT AND TRADEMARK OFFICE

CERTIFICATE OF CORRECTION

PATENT NO. : 7,619,539 B2
APPLICATION NO. : 10/824248
DATED : November 17, 2009
INVENTOR(S) : Veskovic et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 411 days.

Signed and Sealed this

Twenty-sixth Day of October, 2010

David J. Kappos
*Director of the United States Patent and Trademark Office*

US007619539C1

(12) INTER PARTES REEXAMINATION CERTIFICATE (1280th)

United States Patent

Veskovic et al.

(10) Number: US 7,619,539 C1

(45) Certificate Issued: Jun. 8, 2016

(54) MULTIPLE-INPUT ELECTRONIC BALLAST WITH PROCESSOR

(75) Inventors: Dragan Veskovic, Allentown, PA (US); Robert A. Anselmo, Allentown, PA (US); Mark Taipale, Harleysville, PA (US); Matthew Skvoretz, Emmaus, PA (US); Joel S. Spira, Coopersburg, PA (US)

(73) Assignee: LUTRON ELECTRONICS CO., INC.

Reexamination Request:
No. 95/002,260, Sep. 14, 2012

Reexamination Certificate for:

| | |
|---|---|
| Patent No.: | **7,619,539** |
| Issued: | **Nov. 17, 2009** |
| Appl. No.: | **10/824,248** |
| Filed: | **Apr. 14, 2004** |

Certificate of Correction issued Oct. 26, 2010

Related U.S. Application Data

(60) Provisional application No. 60/544,479, filed on Feb. 13, 2004.

(51) Int. Cl.

| | |
|---|---|
| ***G05B 19/02*** | (2006.01) |
| ***G05B 11/01*** | (2006.01) |
| ***G08C 19/16*** | (2006.01) |
| ***H05B 41/36*** | (2006.01) |
| ***H05B 37/02*** | (2006.01) |

(52) U.S. Cl.
CPC ............ *H05B 41/36* (2013.01); *H05B 37/0254* (2013.01); *H05B 37/0272* (2013.01)

(58) Field of Classification Search
None
See application file for complete search history.

(56) References Cited

To view the complete listing of prior art documents cited during the proceeding for Reexamination Control Number 95/002,260, please refer to the USPTO's public Patent Application Information Retrieval (PAIR) system under the Display References tab.

*Primary Examiner* — Robert Nasser

(57) ABSTRACT

A ballast having a microprocessor embedded therein is controlled via four inputs. The ballast includes a high-voltage phase-controlled signal provided by a dimmer and an infrared (IR) receiver through which the ballast can receive data signals from an IR transmitter. The ballast can also receive commands from other ballasts or a master control on the serial digital communication link, such as a DALI protocol link. The fourth input is an analog signal, which is simply a DC signal that linearly ranges in value from a predetermined lower limit to a predetermined upper limit, corresponding to the 0% to 100% dimming range of the load. The output stage of the ballast includes one or more FETs, which are used to control the current flow to the lamp. Based on these inputs, the microprocessor makes a decision on the intensity levels of the load and directly drives the FETs in the output stage.

At the time of issuance and publication of this certificate, the patent remains subject to pending reissue application number 15/136,011 filed Apr. 22, 2016. The claim content of the patent may be subsequently revised if a reissue patent is issued from the reissue application.

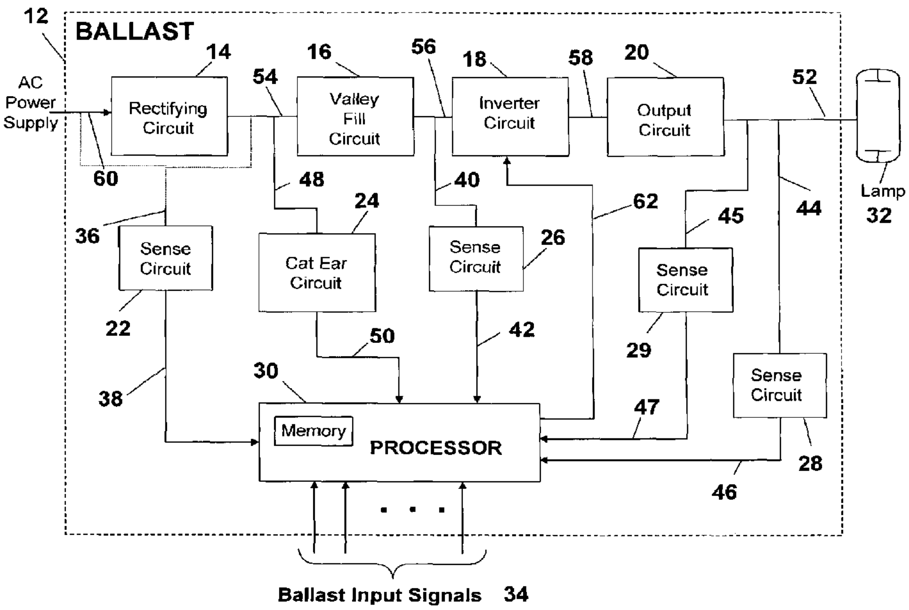

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

The patentability of claims 7 and 8 is confirmed.

Claims 1-6 and 9-30 are cancelled.

* * * * *